(12) United States Patent
Nagai et al.

(10) Patent No.: US 7,376,626 B2
(45) Date of Patent: May 20, 2008

(54) INFORMATION RECORDING MEDIUM, INFORMATION PROCESSING APPARATUS, INFORMATION PROCESSING METHOD, AND COMPUTER PROGRAM

(75) Inventors: Norihiro Nagai, Kanagawa (JP); Akira Kurihara, Kanagawa (JP); Yoshimichi Kitaya, Kanagawa (JP); Yoshitomo Osawa, Kanagawa (JP); Naomi Urano, Kanagawa (JP); Masao Morita, Tokyo (JP); Toshiharu Fukui, Kanagawa (JP)

(73) Assignee: Sony Corporation, Tokyo (JP)

( * ) Notice: Subject to any disclaimer, the term of this patent is extended or adjusted under 35 U.S.C. 154(b) by 65 days.

(21) Appl. No.: 10/495,088

(22) PCT Filed: Sep. 11, 2003

(86) PCT No.: PCT/JP03/11616

§ 371 (c)(1),
(2), (4) Date: May 10, 2004

(87) PCT Pub. No.: WO2004/025482

PCT Pub. Date: Mar. 25, 2004

(65) Prior Publication Data

US 2005/0005141 A1 Jan. 6, 2005

(30) Foreign Application Priority Data

Sep. 11, 2002 (JP) ............................... 2002-265417

(51) Int. Cl.
*G06Q 99/00* (2006.01)
(52) U.S. Cl. ...................... 705/57; 713/176; 705/51
(58) Field of Classification Search .................. 705/51, 705/59; 713/177, 176, 168, 193; 380/282
See application file for complete search history.

(56) References Cited

U.S. PATENT DOCUMENTS 6,028,936 A * 2/2000 Hillis .......................... 713/168

(Continued)

FOREIGN PATENT DOCUMENTS

EP 1071253 A1 * 1/2001

(Continued)

OTHER PUBLICATIONS

Morin, Jean-Henry Konstantas, Dimitri; Commercialization of electronic information, Apr.-Jun. 2000, Journal of End User Computing, vol. 12n2, pp. 20-32.*

*Primary Examiner*—James P. Trammell
*Assistant Examiner*—Behrang Badii
(74) *Attorney, Agent, or Firm*—Finnegan, Henderson, Farabow, Garrett & Dunner, L.L.P.

(57) ABSTRACT

There are provided an information recording medium, and an information processing apparatus and method by which content usage in compliance with copyright protection is made possible in information processing devices such as a CD player and a PC. In the information recording medium, a first data storage area on which a copying prevention process is performed, and a second data storage area in which is stored an encrypted content file containing encrypted content, and encrypted key data such that key data for use in a decryption process is encrypted and which can be decrypted only in a device having a license are set. It becomes possible to play back the recorded content of a first data recording field in a playback device such as a CD player, and even in an information processing device, such as a PC, it is possible to decrypt and play back encrypted content of a second data recording field under the condition of obtaining a license.

5 Claims, 28 Drawing Sheets

U.S. PATENT DOCUMENTS

| | | | |
|---|---|---|---|
| 2002/0116339 A1* | 8/2002 | Lin | 705/59 |
| 2003/0014652 A1* | 1/2003 | Nakayama | 713/193 |
| 2003/0046238 A1* | 3/2003 | Nonaka et al. | 705/51 |
| 2004/0039916 A1* | 2/2004 | Aldis et al. | 713/177 |
| 2005/0216743 A1* | 9/2005 | Peinado | 713/176 |

FOREIGN PATENT DOCUMENTS

| | | |
|---|---|---|
| EP | 1 081 698 | 3/2001 |
| JP | 2000 293439 | 10/2000 |
| JP | A-2001-067791 | 3/2001 |
| JP | 2001 176192 | 6/2001 |
| JP | 2001 250322 | 9/2001 |
| JP | 2001 358707 | 12/2001 |
| JP | 2002 50122 | 2/2002 |
| JP | A-2002-215564 | 8/2002 |

* cited by examiner

Fig. 8

(A) ENABLING KEY BLOCK (EKB) EXAMPLE 1

SEND NODE KEY OF VERSION: t TO DEVICES 0, 1, AND 2

| VERSION: t | |
|---|---|
| INDEX | ENCRYPTION KEY |
| 0 | Enc(K(t)0,K(t)R) |
| 00 | Enc(K(t)00,K(t)0) |
| 000 | Enc(K000,K(t)00) |
| 001 | Enc(K(t)001,K(t)00) |
| 0010 | Enc(K0010,K(t)001) |

(A) ENABLING KEY BLOCK (EKB) EXAMPLE 2

SEND NODE KEY OF VERSION: t TO DEVICES 0, 1, AND 2

| VERSION: t | |
|---|---|
| INDEX | ENCRYPTION KEY |
| 000 | Enc(K000,K(t)00) |
| 001 | Enc(K(t)001,K(t)00) |
| 0010 | Enc(K0010,K(t)001) |

Fig. 16

| PRODUCT ID | PID KEY | TITLE | ARTIST |
|---|---|---|---|
| | | ALBUM MASTER | |
| P-1 | 0123456A | ALBUM A | ARTIST A |
| P-2 | B0123456 | ALBUM B | ARTIST B |

Fig. 17

TRANSACTION TABLE

| TID | PRODUCT ID | PID (MEDIA ID) | PRICE |
|-----|------------|----------------|-------|
| T-1 | P-1        | PID1-001       | 300   |
| T-3 | P-2        | PID2-004       | 500   |

Fig. 18

(a) DISK TABLE

| PRODUCT ID | PID (MEDIA ID) | NUMBER OF PURCHASES |
|---|---|---|
| P-1 | PID1-001 | 1 |
| P-1 | PID1-002 | 2 |
| P-1 | PID1-004 | 1 |
| P-1 | PID1-007 | 3 |
| P-2 | PID2-003 | 2 |

(b) ALBUM PRICE MASTER

| PRODUCT ID | NUMBER OF PURCHASES | PRICE |
|---|---|---|
| P-1 | 1 | ¥500 |
| P-1 | 2 | ¥300 |
| P-1 | 3 | ¥0 |
| P-2 | 1 | ¥500 |
| P-2 | 2 | ¥300 |
| P-2 | 3 | ¥0 |

Fig. 20

TRACK TABLE

| CONTENT NO. | PRODUCT ID | TITLE |
|---|---|---|
| P-1-1 | P-1 | CONTENT A |
| P-1-2 | P-1 | CONTENT B |
| P-1-3 | P-1 | CONTENT C |
| P-2-1 | P-2 | *Kana AIUEO* |

Fig. 24

551 — START-UP FILE

- TRANSACTION ID (TID)
- PRODUCT ID
- USAGE RIGHT INFORMATION ID (UID)
- SERVICE ID
- LICENSE SERVER URL
- SHOP SERVER URL

Fig. 25

(a)
SERVICE DATA — 570
| LEAF ID | SERVICE ID | E(Kroot,DNK) |

(b)
USAGE RIGHT INFORMATION — 571
| USAGE RIGHT INFORMATION ID (UID) | TIME STAMP | LEAF ID | CONTENT ID (CID) | CONTENT TYPE FOR THE OBJECT OF USAGE CONDITION |

(c) CONTENT — 572
| SERVICE ID | EKB | Enc(Kroot,Kc) | Enc(Kc,Content) |

INFORMATION RECORDING MEDIUM, INFORMATION PROCESSING APPARATUS, INFORMATION PROCESSING METHOD, AND COMPUTER PROGRAM

TECHNICAL FIELD

The present invention relates to an information recording medium, an information processing apparatus, an information processing method, and a computer program. More particularly, the present invention relates to an information recording medium, an information processing apparatus, an information processing method, and a computer program in which a first data recording field as a content recording field having a copyright-protectable copying or ripping prevention function and a second data recording field having recorded therein encrypted content are set in a content recording medium such as a CD, thus enabling the recorded content of the first data recording field to be played back in a CD player, and in which, in an information processing device capable of performing copying and ripping processing, such as a PC, it is possible to decrypt and play back encrypted content of the second data recording field under the condition of obtaining a license.

BACKGROUND ART

In recent years, various kinds of software data (hereinafter referred to as "content"), such as audio data such as music, image data such as movies, game programs, and various kinds of application programs have been distributed via a network such as the Internet or through recording media such as DVDs and CDs. This distributed content is used by being played back in a PC (Personal Computer), a CD player, a DVD player, etc., owned by a user.

Regarding most content, such as music data, image data, etc., in general, the distribution right is owned by the creator thereof or a seller thereof. Therefore, in order to play back or use normal content other than an exceptional free-of-charge distributed content, it is necessary to obtain an authorized content usage right. For example, in the case of a CD, a purchase of a CD by paying a price appropriate for the CD is a condition for playback in a player.

Furthermore, when content is to be received via a network such as the Internet by using a PC, a communication terminal, etc., content is provided from a provider under the condition that the user pays a price appropriate for content usage to the content provider by inputting user information such as the user's credit number.

However, even if such a price payment process during content provision is performed, illegally copied data will spread if a user who obtains content performs recording from, for example, a CD into another recording medium (so-called copying), or if a so-called ripping process in which, in a PC, etc., content is read as digital data from a CD, etc., and is stored as a file in the computer is permitted.

Ripping in a PC, etc., is a process of copying data digitally, and the quality of the original data is maintained. When the ripped data is written into another CD-R, a content CD having exactly the same quality as that of the original CD is created. Furthermore, it also becomes possible to record ripped data as compressed MP3 data, etc., or to transmit the ripped data via a network.

As described above, the situation in which copyrighted content is illegally copied or altered after the content is temporarily passed to a user and then distributed is undesirable from the viewpoint of copyright protection.

As copyright protection technology for preventing such a situation, an information recording medium provided with a copy control function (for example, a CD with a copy prevention function) has been developed. Examples of the copy prevention functions include copy control technology developed by Midbar Technologies Ltd., and copy control technology developed by US Macrovision Corporation.

The above have a configuration in which, for example, as a result of recording a pseudo-signal in a first track of a CD, when the CD is set in a CD-ROM drive of a PC, the PC does not recognize it as a music CD, making it impossible to perform a playback process using a CD player program of the PC. An ordinary CD player, which is incapable of performing a ripping process, can perform playback of only content data by ignoring the pseudo-signal.

In the manner described above, if attempts are made to play back an information recording medium such as a CD in which copy-controlled content is recorded, as described above, playback is possible in a playback-only CD player, but playback is impossible in a PC, etc. Although this offers the advantages that illegal processes such as copying or ripping are eliminated, it is inconvenient for an authorized content usage user who does not have the intention of performing illegal copying or ripping.

DISCLOSURE OF THE INVENTION

The present invention has been made in view of the above-described problems. The present invention aims to provide an information recording medium, an information processing apparatus, an information processing method, and a computer program in which an encrypted content recording field is provided in a content recording medium such as a CD having recorded thereon content with a copying prevention function so that, even in an information processing device such as a PC, as a result of obtaining a predetermined license, playback and use of the content are made possible by decrypting the encrypted content recorded in the encrypted content recording field.

Specifically, the present invention provides an information recording medium, an information processing apparatus, an information processing method, and a computer program in which a first data recording field serving as a content storage area on which a copyright-protectable copying prevention process is performed and a second data recording field serving as a content storage area on which a copying prevention process is not performed and having recorded therein encrypted content are set in a content recording medium such as a CD, thus enabling the recorded content of the first data recording field to be played back in a playback device such as a CD player, and even in an information processing device capable of copying and ripping processing, such as a PC, it is possible to decrypt and play back encrypted content of the second data recording field under the condition of obtaining a license.

A first aspect of the present invention is concerned with an information recording medium having stored thereon content data, the information recording medium including:

a first data storage area, which is set as a content storage area on which a copying prevention process is performed; and a second data storage area, which is a content storage area on which a copying prevention process is not performed and in which is stored an encrypted content file containing encrypted content and encrypted key data such that key data for use in a process for decrypting the encrypted content is encrypted and which can be decrypted only in a device having a license.

In one form of the information recording medium of the present invention, the encrypted content in the encrypted content file stored in the second data storage area is content which is encrypted by a content key Kc as an encryption processing key, and the content key Kc is set as a key which can be obtained by performing a process including a process for decrypting an enabling key block (EKB) based on key data provided using a key distribution tree structure.

In one form of the information recording medium of the present invention, data stored in the second data storage area contains a program for executing a process for reading identification information required to obtain a license from the information recording medium.

In one form of the information recording medium of the present invention, the second data storage area is structured in such a manner that identifier data (PID) having a media ID serving as an identifier unique to the information recording medium and a MAC as alteration verification data is stored.

In one form of the information recording medium of the present invention, the second data storage area is structured in such a manner that a product ID serving as an identifier, which is set for each product corresponding to a set of a plurality of information recording media is stored, and combination data of the media ID and the product ID is structured as a global unique identifier.

In one form of the information recording medium of the present invention, a content file stored in the second data storage area contains content data (Enc (Kc, Content)) which is encrypted by a content key [Kc], content key data (Enc (Kroot, Kc)) which is encrypted by a root key [Kroot], and an enabling key block (EKB) from which the root key [Kroot] can be obtained by a decryption process using a device node key (DNK) stored in service data as license data.

In one form of the information recording medium of the present invention, the first data storage area and the second data storage area each have a multi-session structure, which is set as independent session areas formed by a lead-in area indicating a data starting area, a content storage area, and a lead-out area indicating a data ending area.

A second aspect of the present invention is concerned with an information processing apparatus for performing a license obtaining process as a condition for a process for playing back stored content of an information recording medium, the information processing apparatus having a configuration for performing a process for obtaining, from an information recording medium having stored thereon encrypted content data, identifier data (PID) containing a media ID as an identifier unique to the information recording medium and a MAC as alteration verification data, and a product ID as an identifier set for each product corresponding to a set of a plurality-of information recording media, and for transmitting the obtained PID and product ID as license obtaining data to license providing system component entities.

In one form of the information processing apparatus of the present invention, the encrypted content is content, which is encrypted by a content key Kc as an encryption processing key, and the content key Kc is set as a key which can be obtained by performing a process including a process for decrypting the enabling key block (EKB) based on the key data provided using a key distribution tree structure, and the information processing apparatus receives, from the license providing system component entities, service data and usage right information as license data, performs a process for the enabling key block (EKB) on the basis of the stored data of the license data, to performs a process for decrypting the encrypted content data stored on the information recording medium.

A third aspect of the present invention is concerned with an information processing method for performing a license obtaining process as a condition for a process for playing back stored content of an information recording medium, the information processing method including:

an ID reading step of reading, from an information recording medium having stored thereon encrypted content data, identifier data (PID) containing a media ID as an identifier unique to the information recording medium and a MAC as alteration verification data, and a product ID as an identifier set for each product corresponding to a set of a plurality of information recording media; and an ID transmission step of transmitting the PID and the product ID, which are obtained in the ID reading step, as license obtaining data to license providing system component entities.

In one form of the information processing method of the present invention, the encrypted content is content, which is encrypted by the content key Kc as an encryption processing key, and the content key Kc is set as a key which can be obtained by performing a process including a process for decrypting the enabling key block (EKB) based on the key data provided using a key distribution tree structure. The information processing method further includes a step of receiving, from the license providing system component entities, service data and usage right information as license data; and a step of performing a process for the enabling key block (EKB) on the basis of the stored data of the license data and performing a process for decrypting the encrypted content data stored on the information recording medium.

A fourth aspect of the present invention is concerned with a computer program, in which is described a processing program for performing a license obtaining process as a condition for playing back stored content of an information recording medium, the computer program including the steps of:

an ID reading step of reading, from an information recording medium having stored thereon encrypted content data, identifier data (PID) containing a media ID as an identifier unique to the information recording medium and a MAC as alteration verification data, and a product ID as an identifier set for each product corresponding to a set of a plurality of information recording media; and a step of transmitting the PID and the product ID, which are obtained in the ID reading step, as license obtaining data to license providing system component entities.

According to the configuration of the present invention, in an information recording medium, such as a CD, a first data storage area, which is set as a content storage area on which a copying prevention process is performed, and a second data storage area, which is a content storage area on which a copying prevention process is not performed and in which is stored an encrypted content file containing encrypted content, and encrypted key data such that key data for use in a process for decrypting the encrypted content is encrypted and which can be decrypted only in a device having a license are set as different session areas. Thus, it is possible to play back the recorded content of the first data recording field in a playback device such as a CD player, and even in an information processing device capable of copying and ripping processing, such as a PC, it is possible to decrypt and play back encrypted content of the second data recording field under the condition of obtaining a license.

According to the configuration of the present invention, the encrypted content in the encrypted content file stored in the second data storage area is content which is encrypted using the content key Kc serving as an encryption processing key, and the content key Kc is set as a key which can be obtained by performing a process including a process for decrypting an enabling key block (EKB) based on key data provided using a key distribution tree structure. Therefore, management of content usage under a strict license management becomes possible.

According to the configuration of the present invention, the identification data (PID) having a media ID serving as an identifier unique to the information recording medium and a MAC serving as alteration verification data are stored in the second data storage area, so that alteration verification using MAC verification is performed when a license is issued. Therefore, it is possible to eliminate the possibility that an invalid license is obtained.

According to the configuration of the present invention, a product ID serving as an identifier, which is set for each product corresponding to a set of a plurality of information recording media, is stored in the second data storage area, and the combination data of the media ID and the product ID is set as a global unique identifier. Therefore, it is possible to reliably and efficiently perform license issuance management.

The computer program of the present invention is a computer program which can be provided to, for example, a general-purpose computer system capable of executing various program codes, such computer program being provided by means of a storage medium and a communication medium, which are provided in a computer-readable form, for example, a storage medium such as a CD, an FD, and an MO, and a communication medium such as a network. By providing such a program in a computer-readable form, a process corresponding to the program is realized on the computer system.

Further objects, features and advantages of the present invention will become apparent from the embodiments (to be described later) of the present invention with reference to the attached drawings. In this specification, the system designates a logical assembly of a plurality of devices, and it is not essential that the devices be disposed in the same housing.

BRIEF DESCRIPTION OF THE DRAWINGS

FIG. 8 shows an example of an enabling key block (EKB) used for distributing various kinds of keys and data.

FIG. 16 shows an example of the structure of an album master table.

FIG. 17 shows an example of the structure of a transaction table.

FIG. 18 shows an example of the structures of a disk table and an album price master table.

FIG. 20 shows an example of the structure of a track table.

FIG. 24 shows an example of a start-up file provided to the client in the license obtaining process.

FIG. 25 shows an example of the data structures of service data and usage right information.

BEST MODE FOR CARRYING OUT THE INVENTION

The configuration of the present invention will now be described below in detail. Descriptions are given in accordance with each item described below.

1. Content Recording Structure of Information Recording Medium
2. System Configuration
3. Tree Structure as Key Distribution Structure
4. Distribution of Keys using EKB
5. Format of EKB
6. Category Classification of Tree
7. License Purchasing and Content Playback Process

[1. Content Recording Structure of Information Recording Medium]

Figure 1:
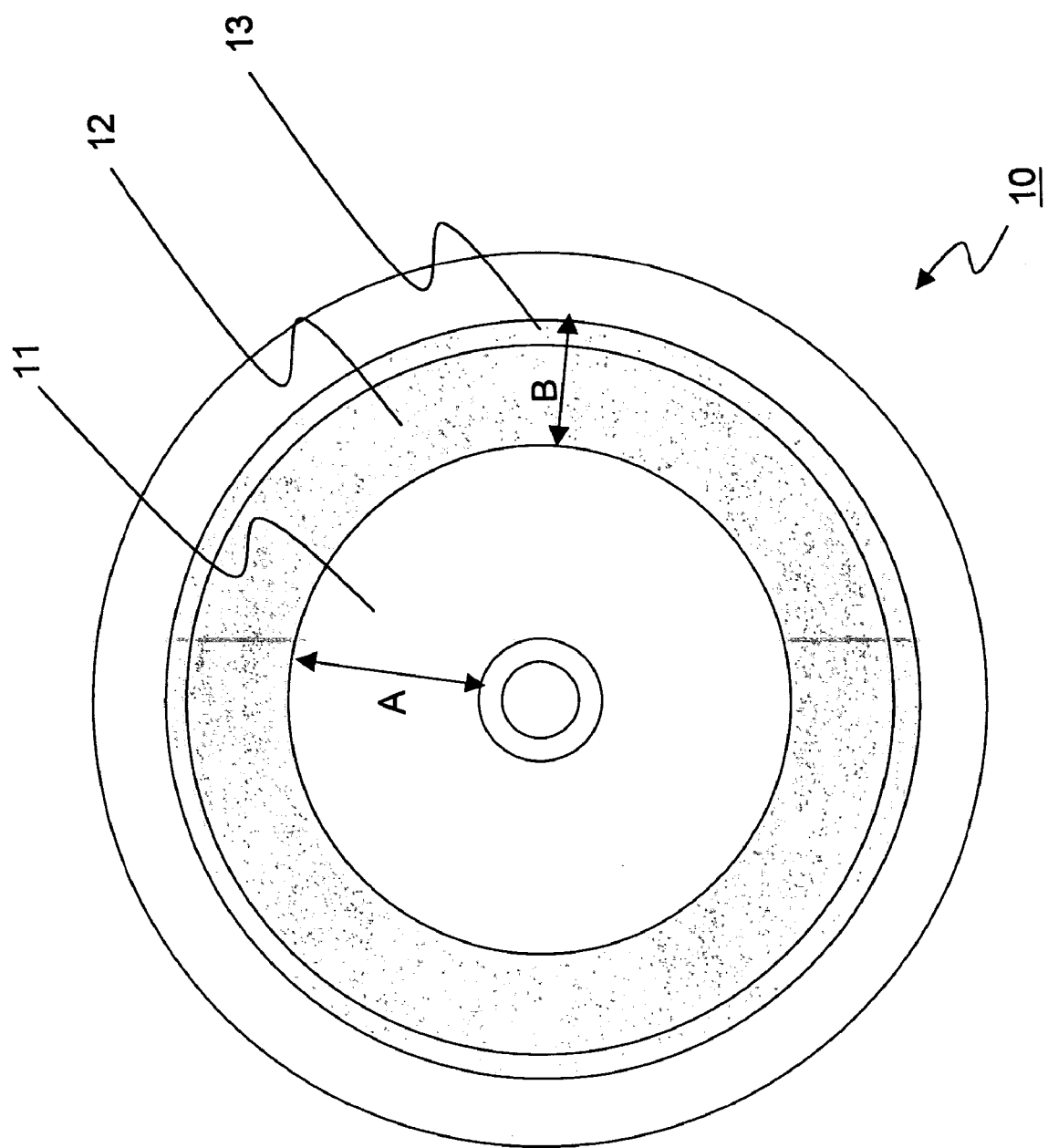
FIG. 1 shows the structure of an information recording medium having a first data storage area on which a copying prevention process is performed and a second data storage area on which a copying prevention process is not performed.

First, a description will be given, with reference to FIG. 1, of the content recording structure of an information recording medium according to the present invention. FIG. 1 shows a plan view of an information recording medium 10, such as a CD, a DVD, etc. The data recording area of the information recording medium is divided into two areas.

In the inner region (A) of the disk-shaped information recording medium 10, a copyright-protectable content data recording area, that is, a first data recording field (1st session) 11 is set as a content recording field having copying and ripping prevention functions. Furthermore, in the outer region (B) of the information recording medium 10, a second data recording field (2nd session) 12 in which encrypted content is recorded is set.

That is, the information recording medium 10 is an information recording medium in which are set the first data storage area (1st session) 11 serving as a content storage area on which a copying prevention process is performed and the second data storage area (2nd session) 12, which is a content storage area on which a copying prevention process is not performed and in which are stored an encrypted content file containing encrypted content and encrypted key data such that key data used for an encrypted content decryption process is encrypted and for which a decryption process is possible in only a device having a license.

One session is a unit area formed of a lead-in area formed of a data area (for example, silence data) indicating a data starting area, a content storage area, and a lead-out area indicating a data ending area. The information recording medium 10 shown in FIG. 1 is a recording medium having a multi-session structure, on which two sessions are recorded.

The recorded content of the first data recording field 11 is recorded as content subjected to a copying prevention process. For example, the configuration is such that, when a CD, in whose first track a pseudo-signal is recorded, is placed in a CD-ROM drive of a PC, the PC does not recognize it as a music CD, so that a playback process using a music CD playback processing program of the PC is not performed. As the copy prevention functions, for example, various copying prevention functions, such as copy control technology developed by Midbar Technologies Ltd., and copy control technology developed by US Macrovision Corporation, can be used.

The recorded content of the first data recording field 11 is set as a content recording field in which a ripping process and a copying process, by which the recorded content is read as digital data from a CD loaded into, for example, a CD drive of a PC and is stored in another recording medium or such that the recorded content is converted into compressed data of MP3, are prevented.

The recorded content of the first data recording field 11 can be played back at a playback processing device (player), such as an ordinary CD player, having a playback function as a dedicated function. That is, a CD player that does not have a copying processing or ripping processing program and that can perform only CD playback is able to play back the content data by ignoring a pseudo-signal even if the pseudo-signal is recorded in the first track.

On the other hand, the recorded content of the second data recording field 12 is encrypted content. This encrypted content can be played back by performing a decryption process. The key data for performing the decryption process can be obtained by obtaining a content usage right (license). Although this will be described later in more detail, content decryption becomes possible by performing a process including a process for decrypting an enabling key block (EKB) using key data distributed by a key distribution tree structure.

Therefore, the recorded content of the second data recording field 12 can be used only when a valid license is possessed. Even in a PC that cannot play back the recorded content of the first data recording field 11, it becomes possible to play back and use the recorded content of the second data recording field 12 by receiving a valid license.

In part of the second data recording field 12, a PID (Postscribed-ID) recording area 13 is provided. PID is data that contains media ID which is given as a unique identifier (ID) for each disk in a predetermined disk cluster unit, such as a title unit, an album unit, a category unit, and a manufacturing lot unit, as well as version information, and to which a MAC is added as a data alteration verification code.

Figure 2:
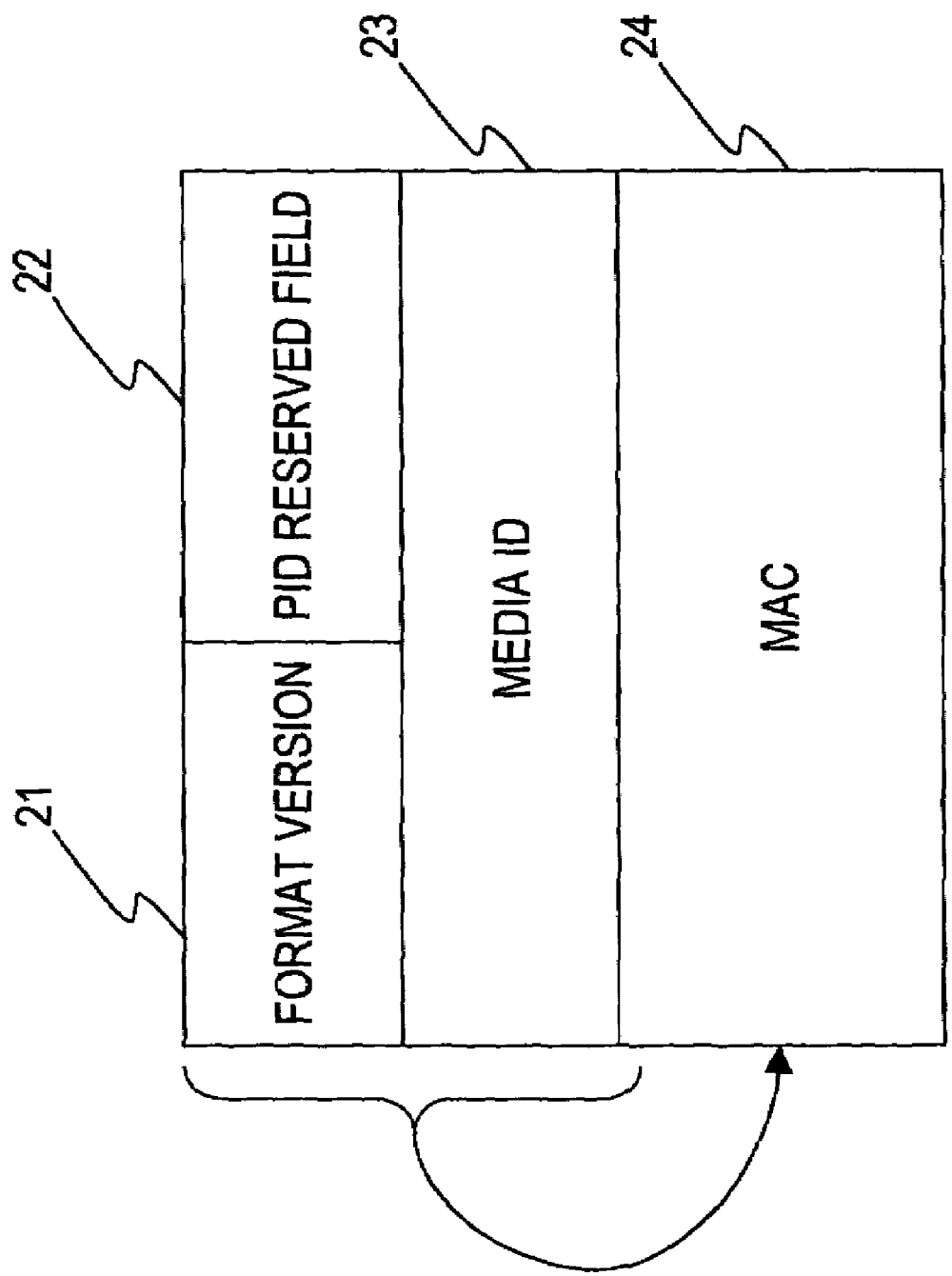
FIG. 2 shows an example of a data format of PID data.

FIG. 2 shows an example of the data structure of a PID. The PID has a configuration having a format version 21 indicating the format version of the PID, a PID reserved field 22, and a media ID 23 as unique identification data for each disk, in which a MAC 24 as the alteration verification code is added to this data.

The message authentication code (MAC) is generated as data for verifying the alteration of data. For the MAC generation process and verification process, various modes are possible, but as one example, a MAC value generation example using a DES encryption processing structure is shown in FIG. 3.

Figure 3:
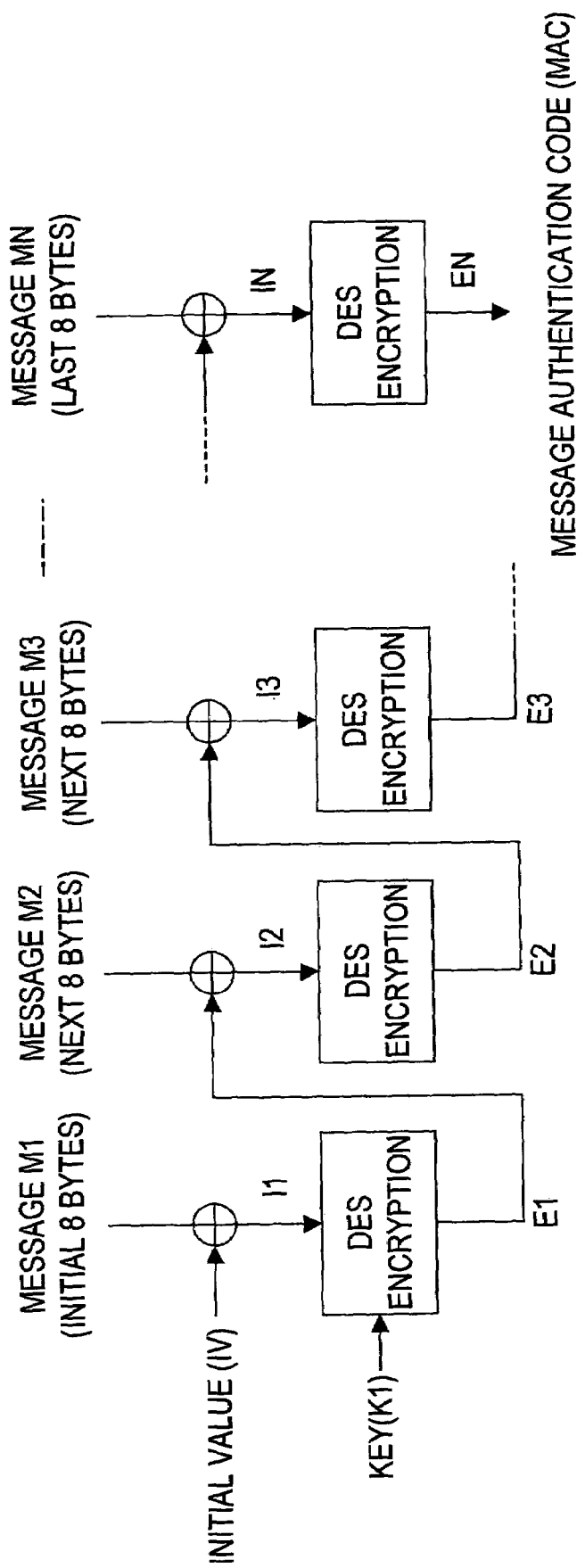
FIG. 3 shows an example of a MAC value generation process.

A description is given of a MAC value generation example using the DES encryption processing structure of FIG. 3. A message to be processed is divided into 8-byte units (hereinafter the divided messages will be referred to as "M1, M2, ..., MN"). First, the exclusive OR of the initial value (hereinafter abbreviated as "IV") and M1 is computed (the result is denoted as I1). Next, I1 is input to a DES encryption section, where it is encrypted (hereinafter the output is referred to as "E1") using a key (hereinafter referred to as "K1"). Then, the exclusive OR of E1 and M2 is computed, the output I2 thereof is input to the DES encryption section, where it is encrypted using the key K1 (output E2). Hereafter, this is repeated, so that the encryption process is performed on all the messages. EN, which is output finally, becomes the message authentication code (MAC).

The MAC value becomes a different value when the generation source data is changed. Consequently, if a match occurs when the MAC generated in accordance with the data (message) to be verified is compared with the recorded MAC, it is certified that the data (message) to be verified has not been changed or altered.

Figure 4:
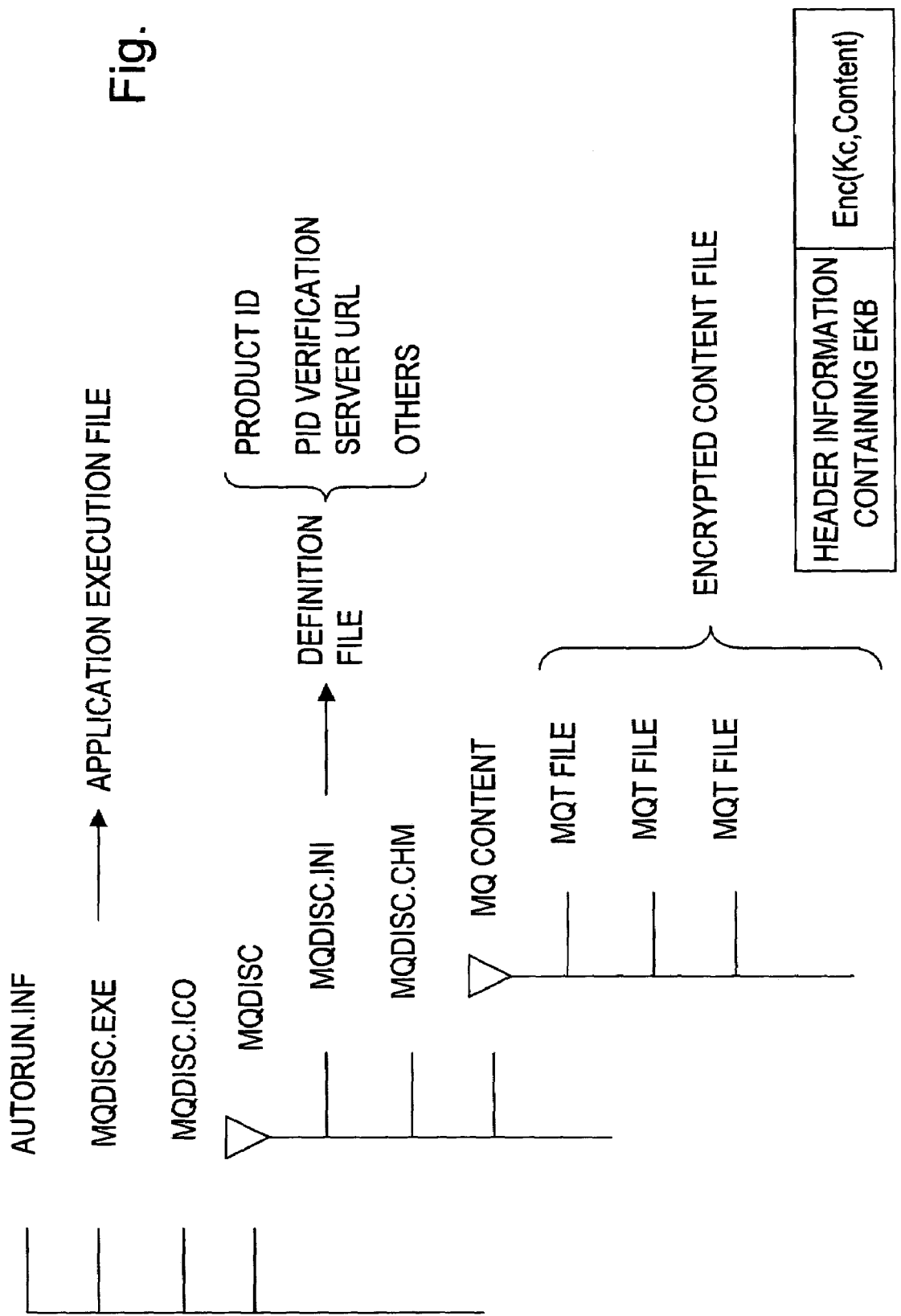
FIG. 4 shows the directory structure of the second data storage area.

The directory structure example of a data file stored in the second data recording field 12 is shown in FIG. 4. The directory has a CD application file [MQDISC.EXE] which is automatically executed upon being loaded into the CD drive of the PC, has a definition file [MQDISC.INI] at the lower order, and contains one or more encrypted content files [MQT files].

In the definition file [MQDISC.INI], there are stored a product ID, which is set as an identifier in a predetermined disk cluster unit, such as a title unit, an album unit, a category unit, and a manufacturing lot unit; URL information of a PID verification server which is set as a verification server for verifying the transmission data from the user side during a license obtaining process as the right for playing back and using encrypted content stored in the second data recording field 12; and so on.

The above-described media ID defined in the PID is an ID set as a different ID for each disk with respect to one product ID, and the combination of the product ID and media ID is basically global unique identification data.

The encrypted content file [MQT file] has data [Enc (Kc, Content)] such that content is encrypted using a content key Kc. Enc (A, B) indicates data such that B is encrypted by A.

Furthermore, the encrypted content file [MQT file] contains header information containing the enabling key block (EKB). The enabling key block (EKB) is encrypted data which can be decrypted using a device node key (DNK), which is distributed to a valid device. It becomes possible for the user to decrypt the enabling key block (EKB) by obtaining a license as an authorized content usage right, so that the encrypted content data [Enc (Kc, Content)] can be decrypted using the content key Kc obtained on the basis of the EKB decryption process, and the content can thus be played back and used. The details of these processes will be described later.

When the encrypted content recorded in the second data recording field is to be played back, it is necessary to obtain a license. For obtaining the license, an information processing apparatus such as a PC that intends to perform a playback process reads the product ID and the PID (see FIG. 2) recorded in the second data recording field, and transmits them to the PID verification server specified by the URL described in the definition file [MQDISC.INI]. At the PID verification server, the above-described MAC verification process of the PID is performed to perform a determination process as to whether or not the transmission data of the user is valid data. When the data is valid, a license is given to the user through predetermined procedures. The license giving process will be described in detail later.

[2. System Configuration]

A description will now be given, with reference to FIG. 5, of an example of a system configuration formed of entities which perform information recording medium manufacturing and providing processes described with reference to FIG. 1, a license providing entity for performing a license providing process as a right for playing back and using encrypted content of the second data recording field, and a client which uses content.

A client 50 which uses content purchases an information recording medium 80, such as a CD, from the disk manufacturing and providing entity. The information recording medium 80, as described with reference to FIG. 1, is an information recording medium in which are set a first data recording field (1st session) set as a content storage area on which a copying prevention process is performed and a second data recording field (2nd session), which is a content storage area on which a copying prevention process is not performed and in which is stored an encrypted content file containing encrypted content and encrypted key data such that key data used for an encrypted content decryption process is encrypted and for which a decryption process is possible at only a device having a license.

The client is a client which intends to use the encrypted content of the second data recording field 12 of the information recording medium 10 of FIG. 1. The content of the first data recording field 11 of the information recording medium 10 of FIG. 1 is such that, at the same time when the disk (CD, etc.) is purchased, the usage right is distributed. In an ordinary PC, etc., the content cannot be freely played back due to the copying prevention function, but can be freely played back in an ordinary CD player, etc.

Therefore, in the following, a description will be given with emphasis on processing in a case where a client which intends to play back and use encrypted content of the second data recording field in the information recording medium obtains a license to use the content.

Figure 5:
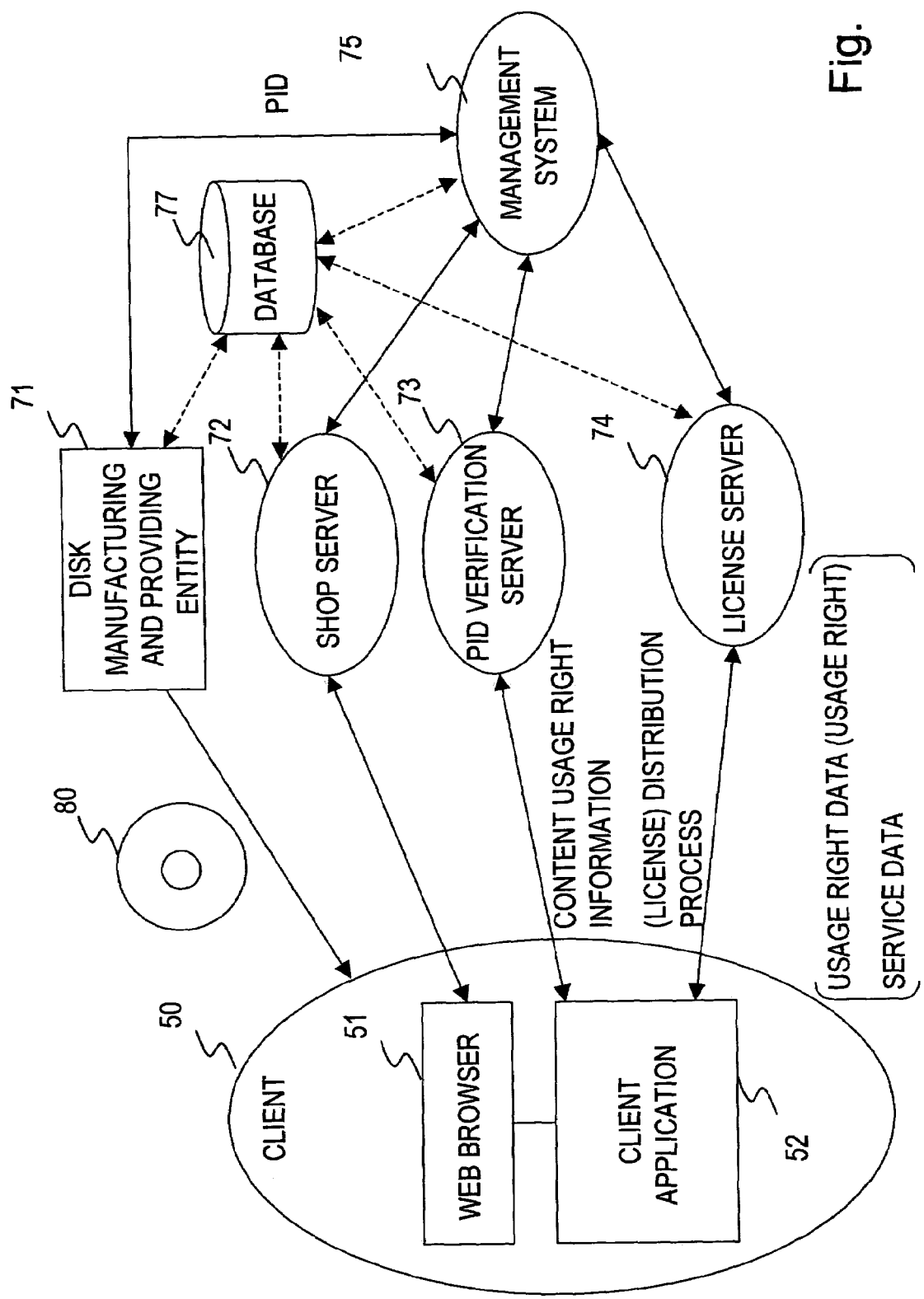
FIG. 5 shows an example of a system for performing a license obtaining process in content usage and playback processes.

The client 50 of FIG. 5 is an information processing apparatus as an apparatus capable of using, that is, playing back, content. Examples thereof include various kinds of information processing devices, such as a PC, a PDA, etc. The client 50 has a browser 51 and a client application 52 as software, and the browser 51, the client application 52, and other programs are executed by control means such as a CPU.

The client application 52 is an application for performing the process of an execution file (see FIG. 4) recorded in the information recording medium such as a CD and for performing a process for obtaining license information containing service data and the content usage right information, which is performed as a series of processes of the license obtaining process. The client application 52 is stored in the information processing apparatus of the client.

The client 50 is connected to a shop server 72, a PID verification server 73, and a license server 74 via, for example, a communication network such as the Internet. When the client 50 intends to play back and use the encrypted content of the second data recording field in the information recording medium 80, the shop server 72 functions as a window through which the content usage right (license) is purchased, and displays the content information such as the license obtaining fee via the browser 51, so that a purchase request from the client 50 is accepted. Furthermore, the shop server 72 performs a billing process for the purchase license as necessary.

The PID verification server 73 performs a PID verification process which is performed as a pre-procedure of the license obtaining process from the client 50. The license server 74 provides, to the client 50, the usage right information of the content used by the client under the condition that the verification succeeds at the PID verification server 73.

Furthermore, a management system 75 is connected to a disk manufacturing and providing entity 71, a shop server 72, a PID verification server 73, and a license server 74. The management system 75, together with the disk manufacturing and providing entity 71, shares the PID information to be recorded in a content storage disk manufactured by the disk manufacturing and providing entity 71. This PID information is transmitted from the client to the PID verification server 73 during a license issuing process, and a verification process is performed at the PID verification server 73.

The management system 75 further performs a process for issuing a transaction ID (TID), which functions as permission information for the license obtaining request from the client 50. Furthermore, the management system 75 makes a permission of issuing usage right data (usage right) as usage right information of the content. The details of these processes will be described later.

In a database 77, data for which access is permitted within the scope of the access right which is set in each of the disk manufacturing and providing entity 71, the shop server 72, the PID verification server 73, the license server 74, and the management system 75, is stored. As will be described later in detail, in the database 77, for example, an album master, a transaction table, a disk table, an album price master table, a track table, and the like are stored. The structure of these tables and processes using the tables will be described later in detail.

In FIG. 5, the shop server 72, the PID verification server 73, the license server 74, and the management system 75 are shown as individual entities. However, they may be formed as a network-connected configuration by discretely arranging them as shown in the figure, and also, they may be formed as one apparatus for performing the processes of all the servers. Alternatively, each of them may be formed as a plurality of apparatuses for performing processes of one or more servers. In this specification, the system for performing a part or the entirety of the processing in the shop server 72, the PID verification server 73, the license server 74, and the management system 75 is called a "license management apparatus".

The client 50 performs, under the control of the client application 52, a series of processes involved with PID verification, including the transmission of the PID and the product ID to the PID verification server 73, and a license obtaining process through a connection with the license server 74. The browsing of the information provided by the shop server 72 and a settlement process are performed by starting up the browser 51 under the control of the client application 52.

In FIG. 5, although one client and one server are shown, a large number of them are connected on a communication network such as, for example, the Internet. The client selects the server corresponding to a service or a process to be performed as appropriate, and makes a connection to the selected server so as to proceed with processing.

Content usage right information corresponding to the content is provided from the license server 74 to the client 50. The client application 52 of the client 50 verifies the usage right information, and decrypts and uses the encrypted content when it is determined that there is a usage right.

As key information for enabling content usage based on the content usage right, the client 50 holds key data, such as an enabling key block (EKB) and a device node key (DNK). The enabling key block (EKB) and the device node key (DNK) are key data used to obtain an encryption key which is necessary to use content for the purpose of making it possible to decrypt and use the encrypted content only at the user device having an authorized content usage right. EKB and DNK will be described later.

The license server 74 generates usage right information (usage right) on the basis of predetermined content usage conditions and provides it to the client 50. Furthermore, the license server 74 generates service data on the basis of the device node key (DNK) and the enabling key block (EKB) provided from the management system 75, and provides them to the client 50. The service data contains an enabling key block (EKB) having a service device node key (SDNK) which is necessary during a process for decrypting the encrypted content.

For the content usage conditions, for example, the limitation of the usage period, the limitation of the number of copies, and the limitation of the number (corresponding to the number of so-called check-outs) of portable media (PM) through which content can be used simultaneously can be set. Examples of portable media (PM) include flash memory, and recording media, which can be used in a portable device such as a small HD, an optical disk, a magneto-optical disk, or an MD (Mini Disk).

Figure 6:
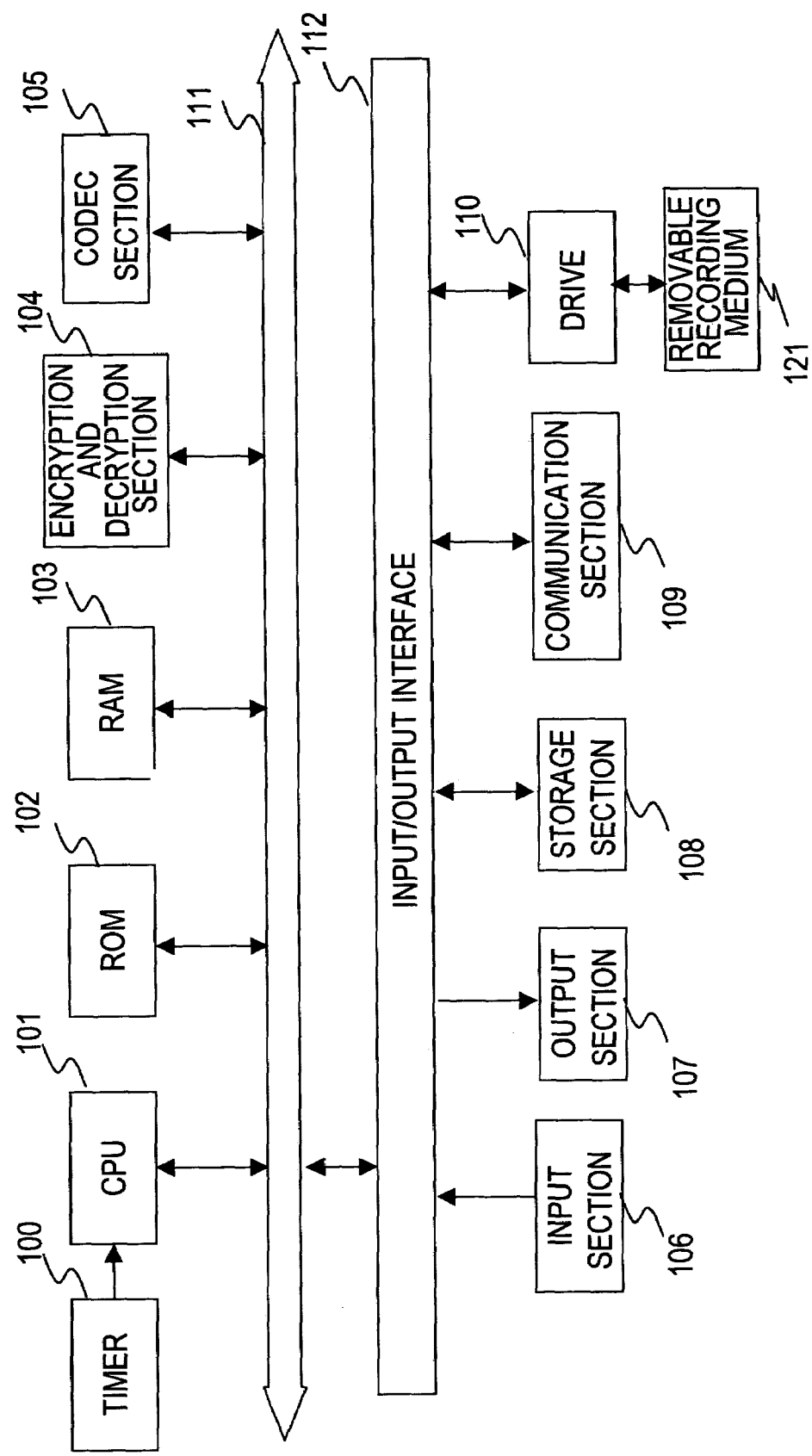
FIG. 6 shows an example of the configuration of an information processing apparatus and a server.

A description will now be given, with reference to FIG. 6, of a hardware configuration example of an information processing apparatus capable of functioning as the client 50, the shop server 72, the PID verification server 73, the license server 74, and the management system 75. Each of these systems is realized by implementing a processing program corresponding to each process in, for example, a PC having a CPU, a server, etc. The configuration of FIG. 6 will now be given below.

A CPU (Central Processing Unit) 101 performs various kinds of processes in accordance with various kinds of programs stored in a ROM (Read Only Memory) 102 or a program which is stored in a storage section 108 and which is loaded into a RAM (Random Access Memory) 103. A timer 100 performs a time measuring process and supplies the clock information to the CPU 101.

The ROM (Read Only Memory) 102 has stored therein programs, parameters for computation, and fixed data, etc., which are used by the CPU 101. The RAM (Random Access Memory) 103 stores programs used during the execution, parameters for computation, which vary as appropriate during the execution by the CPU 101. These elements are interconnected with one another through a bus 111 formed of a CPU bus, etc.

An encryption and decryption section 104 performs a communication data or content encryption process, an encryption process using, for example, a DES (Data Encryption Standard) encryption algorithm, MAC generation and verification processes, etc., as processes using the device node key (DNK) and the enabling key block (EKB). Furthermore, the encryption and decryption section 104 performs various kinds of encryption processes, such as an authentication process during transmission and reception of communication data such as license information, and a session key sharing process, which is performed with respect to another connected device.

A codec section 105 performs a data encoding process and a data decoding process of various kinds of methods, such as, for example, an ATRAC (Adaptive Transform Acoustic Coding) 3 method, and an MPEG method, a JPEG method, etc. Data to be processed is input from a removable recording medium 121 via a bus 111, an input/output interface 112, and a drive 110, or is input via a communication section 109. Furthermore, the processed data is stored in the removable recording medium 121 as necessary, or is output via the communication section 109.

An input section 106 including a keyboard, a mouse, etc., an output section 107 including a display such as a CRT or an LCD, a speaker, etc., a storage section 108 such as a hard disk, and the communication section 109 including a modem, a terminal adapter, etc., are connected to the input/output interface 112, so that data transmission and reception are performed via a communication network such as, for example, the Internet.

[3. Tree Structure as Key Distribution Structure]

Next, a description will be given of a device and key management configuration formed by a tree structure, which is one form of a broadcast encryption method for making it possible for only the client having an authorized content usage right to use content.

Figure 7:
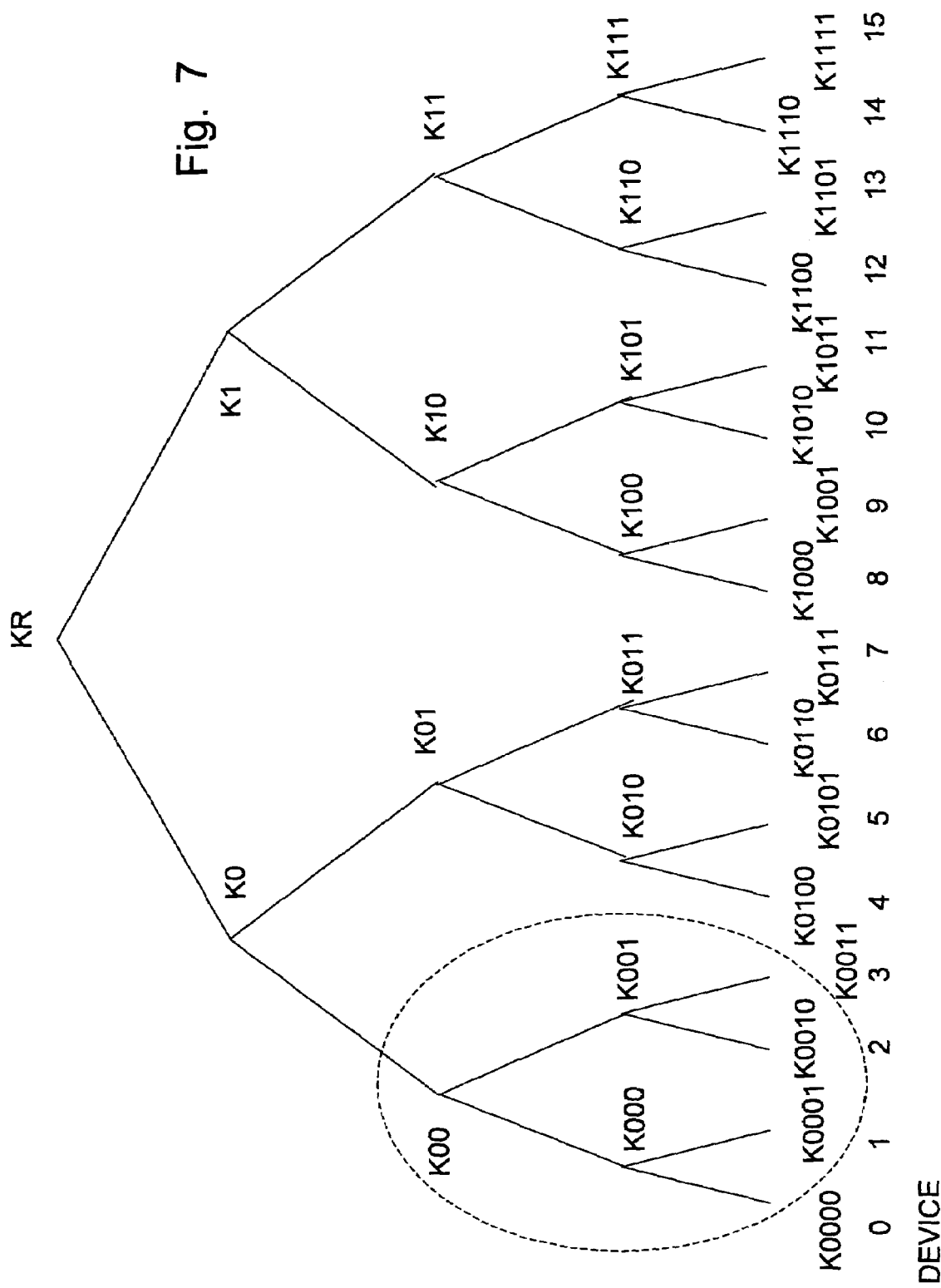
FIG. 7 is a view of tree structure illustrating processes for encrypting and distributing various kinds of keys and data.

Numbers 0 to 15 shown at the lowest stage of FIG. 7 denote user devices as clients which use content. That is, each leaf of the hierarchical tree structure shown in FIG. 7 corresponds to each device.

During manufacturing, before shipment, or thereafter, the devices 0 to 15 store, in memory a key set (device node keys (DNK)) formed of keys (node keys) and the leaf keys of the leafs, which are assigned to the nodes from its own leaf to the root in the hierarchical tree structure shown in FIG. 7. K0000 to K1111 shown at the lowest stage of FIG. 7 are leaf keys, which are assigned to the devices 0 to 15, respectively, and keys KR to K1111 indicated from the highest stage up to the second node from the lowest stage are assumed to be node keys.

In the tree structure shown in FIG. 7, for example, the device 0 owns the leaf key K0000 and the node keys K000, K00, K0, and KR. The device 5 owns K0101, K010, K01, K0, and KR. The device 15 owns K1111, K111, K11, K1, and KR. In the tree of FIG. 7, only 16 devices 0 to 15 are indicated, and the tree structure is shown as a four-stage structure that is symmetrically balanced with respect to the right and left sides. Also, it is possible to have a structure in which a larger number of devices are formed in the tree and a different number of stages are provided in each part of the tree.

The devices contained in the tree structure of FIG. 7 include various types of devices which use various types of recording media, for example, device-embedded types, or a DVD, a CD, an MD, a flash memory, etc., which are configured in such a manner as to be loaded into or removable from the device. Furthermore, various application services can coexist. The hierarchical tree structure, which is a content or key distribution structure shown in FIG. 7, is applied to a structure in which such different devices and different applications coexist.

In the system in which these various devices and applications coexist, for example, the portion surrounded by the dotted line of FIG. 7, that is, the devices 0, 1, 2, and 3, are set as one group in which like recording media are used. For example, with respect to devices contained in this group surrounded by the dotted line, a process of sending common content, which is encrypted, from a provider, of sending a content key which is commonly used among the devices, or of outputting, from each device, the payment data of the content price, which is encrypted, to a provider, a settlement organization, etc., is performed by one operation. It becomes possible for an entity, such as a content server, a license server, or a shop server, for performing data transmission and reception to and from each device to perform a process for collectively sending data by assuming the portion surrounded by the dotted line of FIG. 7, that is, the devices 0, 1, 2, and 3, to be one group. A plurality of such groups exist in the tree of FIG. 7.

The node keys and the leaf keys may be managed in a centralized manner by a management system having one particular key management center function, or may be managed for each group by message data distribution means, such as a provider and a settlement organization, for performing various data transmission and reception to and from each group. An updating process is performed on these node keys and leaf keys, for example, in the case of key leakage, and this updating process is performed by the management system having the key management center function, the provider, and the settlement organization.

In this tree structure, as is clear from FIG. 7, as device node keys (DNK), the devices 0, 1, 2, and 3 contained in one group own, device node keys (DNK) containing common keys K00, K0, and KR. By using this node key shared structure, it becomes possible to provide, for example, common keys to only the devices 0, 1, 2, and 3. For example, the node key K00, which is commonly held, is a key, which is commonly held among the devices 0, 1, 2, and 3. Furthermore, if a value Enc (K00, Knew) such that a new key Knew is encrypted using the node key K00 is distributed to the devices 0, 1, 2, and 3 via a network or through a recording medium in which the value is stored, it becomes possible for only the devices 0, 1, 2, and 3 to obtain a new key Knew by decrypting the Enc (K00, Knew) using the shared node key K00 owned in each device. Enc (Ka, Kb) indicates data such that Kb is encrypted using Ka.

At a particular time t, when the fact that the keys K0011, K001, K00, K0, and KR owned by the device 3 were analyzed by an attacker (hacker) and exposed is found, thereafter, it is necessary to disconnect the device 3 from the system in order to protect the data which is transmitted and received by the system (the group of the devices 0, 1, 2, and 3). For this purpose, it is necessary to update the node keys K001, K00, K0, and KR to new keys K(t)001, K(t)00, K(t)0, and K(t)R, respectively, and to transmit the updated keys to the devices 0, 1, and 2. Here, K(t)aaa indicates an updating key of the generation t of the key Kaaa.

A process for distributing an updating key is described below. The update of a key is performed by supplying a table formed of block data called an enabling key block (EKB) shown in FIG. 8(A) via a network or through a recording medium in which the table is stored. The enabling key block (EKB) is formed of an encryption key for distributing a newly updated key to a device corresponding to each which form the tree structure shown in FIG. 7. The enabling key block (EKB) is also called a "key renewal block (KRB)".

In the enabling key block (EKB) shown in FIG. 8(A), only the device for which the node key needs to be updated is formed as block data having a data structure which can be updated. The example of FIG. 8 shows block data formed for the purpose of distributing the updating node key of the generation t in the devices 0, 1, and 2 in the tree structure shown in FIG. 7. As is clear from 7, the device 0 and the device 1 require K(t)00, K(t)0, and K(t)R as the updating node keys, and the device 2 requires K(t)001, K(t)00, K(t)0, and K(t)R as the updating node keys.

As shown in the EKB of FIG. 8(A), the EKB contains a plurality of encryption keys. The encryption key at the lowest stage is Enc (K0010, K(t)001). This is an updating node key K(t)001, which is encrypted by the leaf key K0010 possessed by the device 2, and the device 2 can obtain K(t)001 by decrypting this encryption key by the leaf key possessed by the device itself. Furthermore, by using the K(t)001 obtained by decryption, the encryption key Enc (K(t)001, K(t)00) of the second stage from the bottom in FIG. 8(A) can be decrypted, making it possible to obtain the updating node key K(t)001. Hereinafter, in a sequential manner, by decrypting the encryption key Enc (K(t)00, K(t)0) of the second stage from the top in FIG. 8(A), the updating node key K(t)0 is obtained, and by decrypting the encryption key Enc (K(t)0, K(t)R) from the top in FIG. 8(A), K(t)R is obtained. On the other hand, in the device K0000.K0001, the node key K000 is not contained in an object to be updated, and the necessary updating node keys are K(t)00, K(t)0, and K(t)R. The device K0000.K0001 obtains K(t)00 by decrypting the encryption key Enc (K000, K(t)00) of the third stage from the top in FIG. 8(A). Hereafter, by decrypting the encryption key Enc (K(t)00, K(t)0) of the second stage from the top in FIG. 8(A), the updating node key K(t)0 is obtained. By decrypting the encryption key Enc (K(t)0, K(t)R) of the first stage from the top in FIG. 8(A), K(t)R is obtained. In this manner, it is possible for the devices 0, 1, and 2 to obtain the updated key K(t)R. The index in FIG. 8(A) indicates the absolute address of the node key and the leaf key, which are used as decryption keys.

In a case where the update of the node keys K(t)0 and K(t)R at the higher-order stage of the tree structure shown in FIG. 7 is not necessary, and a process for updating only the node key K00 is necessary, the use of the enabling key block (EKB) of FIG. 8(B) makes it possible to distribute the updating node key K(t)00 to the devices 0, 1, and 2.

The EKB shown in FIG. 8(B) can be used when, for example, a new content key shared in a specific group is distributed. In a specific example, it is assumed that the devices 0, 1, 2, and 3 in the group indicated by the dotted line in FIG. 7 use a particular recording medium, and a new common content key K(t)con is necessary. At this time, data Enc (K(t), K(t)con) such that a new common updating key K(t)con is encrypted using K(t)00 such that the common node key K00 of the devices 0, 1, 2, and 3 is encrypted is distributed together with the EKB shown in FIG. 8(B). As a result of this distribution, distribution of data which is not decrypted in a device of another group, such as a device 4 becomes possible.

That is, if the devices 0, 1, and 2 decrypt the above encrypted text by using K(t)00 obtained by processing the EKB, it becomes possible to obtain the key at the time t, for example, the content key K(t)con used to encrypt and decrypt content.

[4. Distribution of Keys Using EKB]

Figure 9:
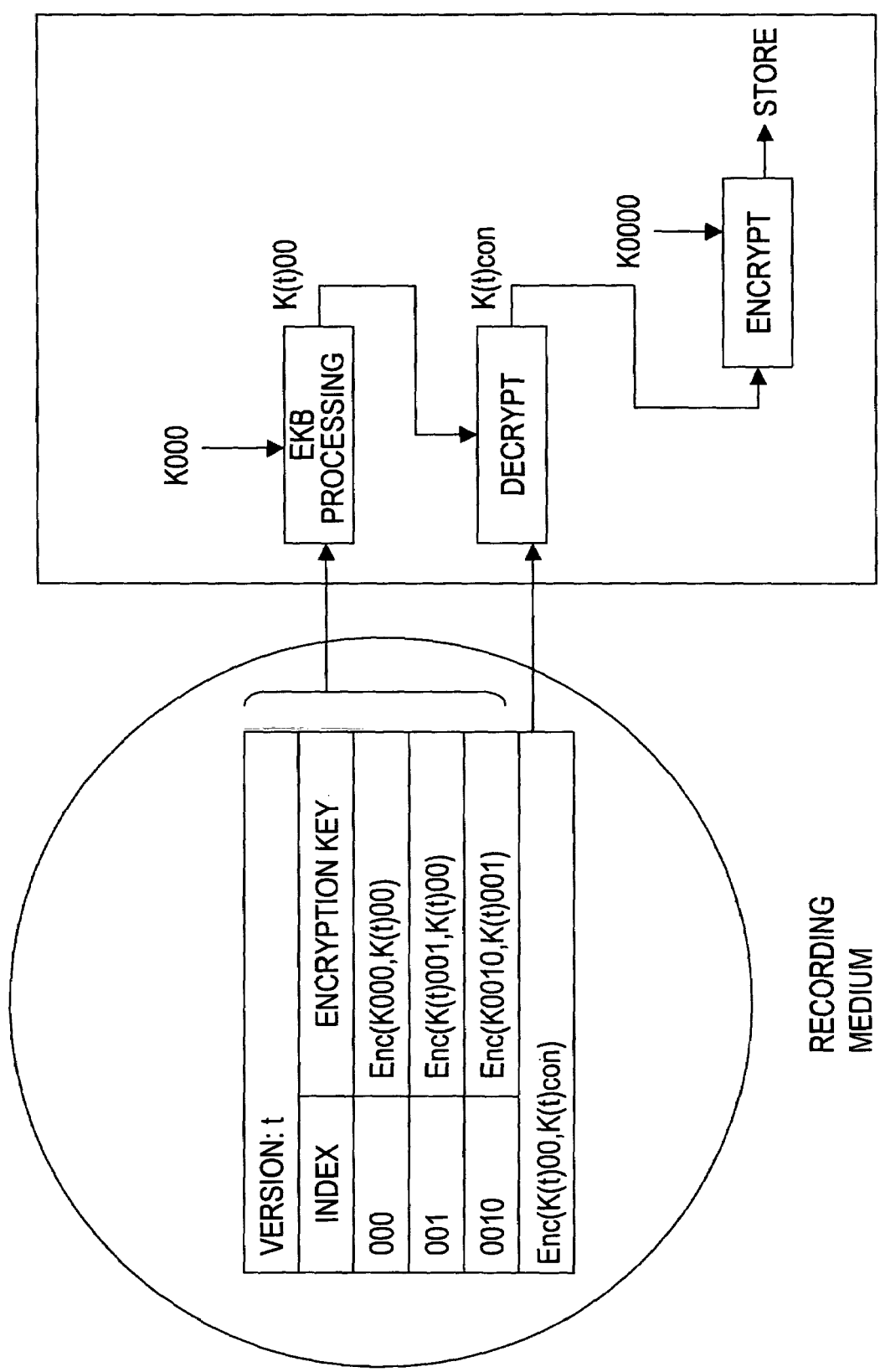
FIG. 9 shows an example of distribution using an enabling key block (EKB) of a content key and an example of a decryption process.

As a processing example in which the key at the time in point t, for example, the content key K(t)con used to encrypt and decrypt content is obtained, FIG. 9 shows a processing example of the device 0 which receives, through a recording medium, data Enc (K(t)00, K(t)con) such that a new common content key K(t)con is encrypted using K(t)00 and the EKB shown in FIG. 8(B). That is, this is an example in which encrypted message data using the EKB is made the content key K(t)con.

As shown in FIG. 9, the device 0 generates a node key K(t)00 by an EKB process similar to that described above by using the EKB at the time of the generation t, which is stored in the recording medium, and the node key K000, which is prestored in the device itself. Furthermore, the device 0 decrypts the updating content key K(t)con by using the decrypted updating content key K(t)00, encrypts it using the leaf key K0000 possessed by only the device itself, and stores it for future use.

[5. Format of EKB]

Figure 10:
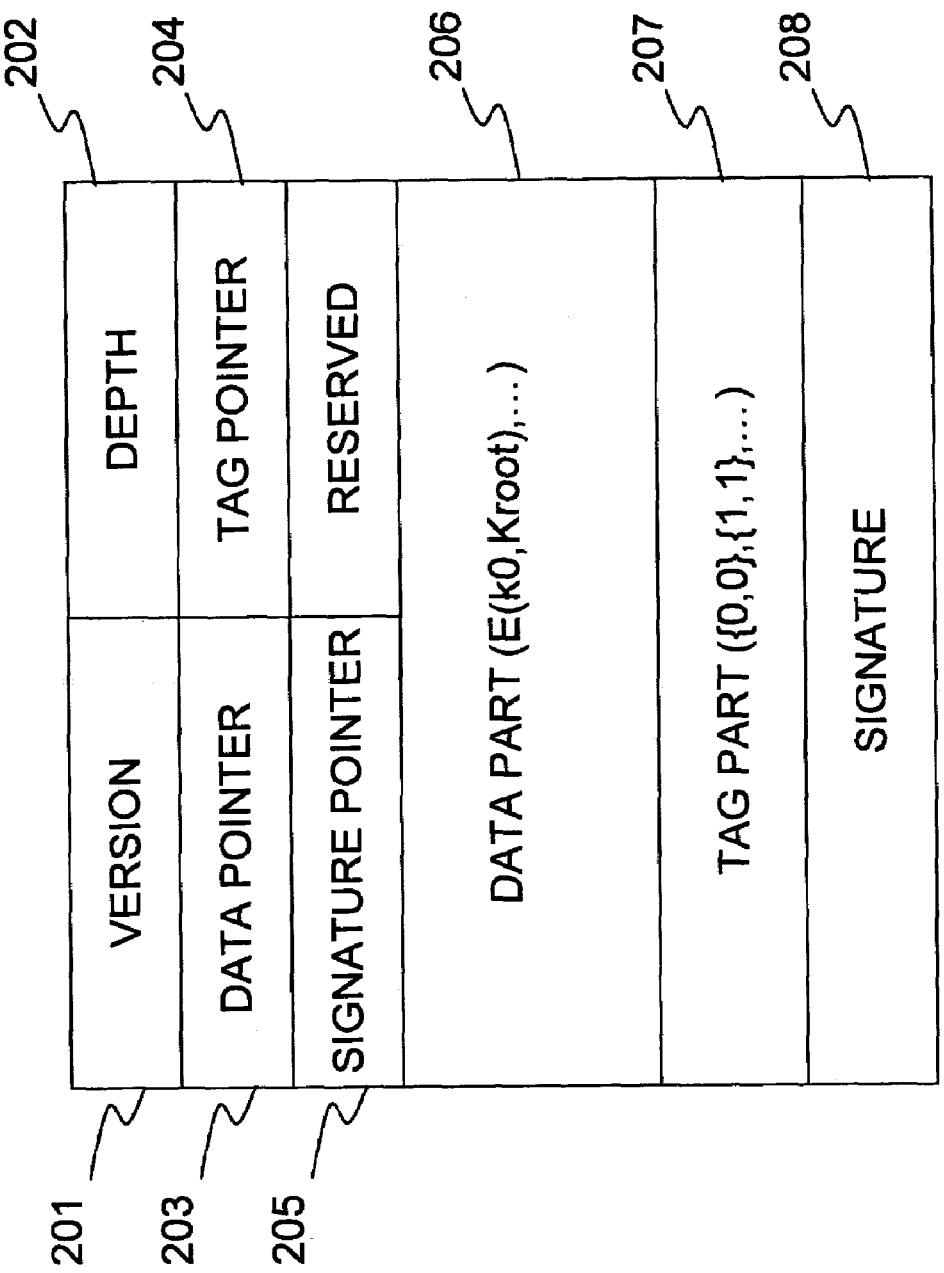
FIG. 10 shows an example of the format of the enabling key block (EKB).

FIG. 10 shows an example of the format of the enabling key block (EKB). A version 201 is an identifier indicating the version of the enabling key block (EKB). The version has a function for identifying the most recent EKB and a function for indicating the corresponding relationship with content. The depth indicates the number of hierarchies of the hierarchical tree with respect to the device of the distribution destination of the enabling key block (EKB). A data pointer 203 is a pointer indicating the position of the data part in the enabling key block (EKB). A tag pointer 204 is a pointer indicating the position of the tag part. A signature pointer 205 is a pointer indicating the position of a signature.

A data part 206 stores, for example, data such that a node key to be updated is encrypted. For example, encryption keys pertaining to updated node keys shown in FIG. 8 are stored.

Figure 11:
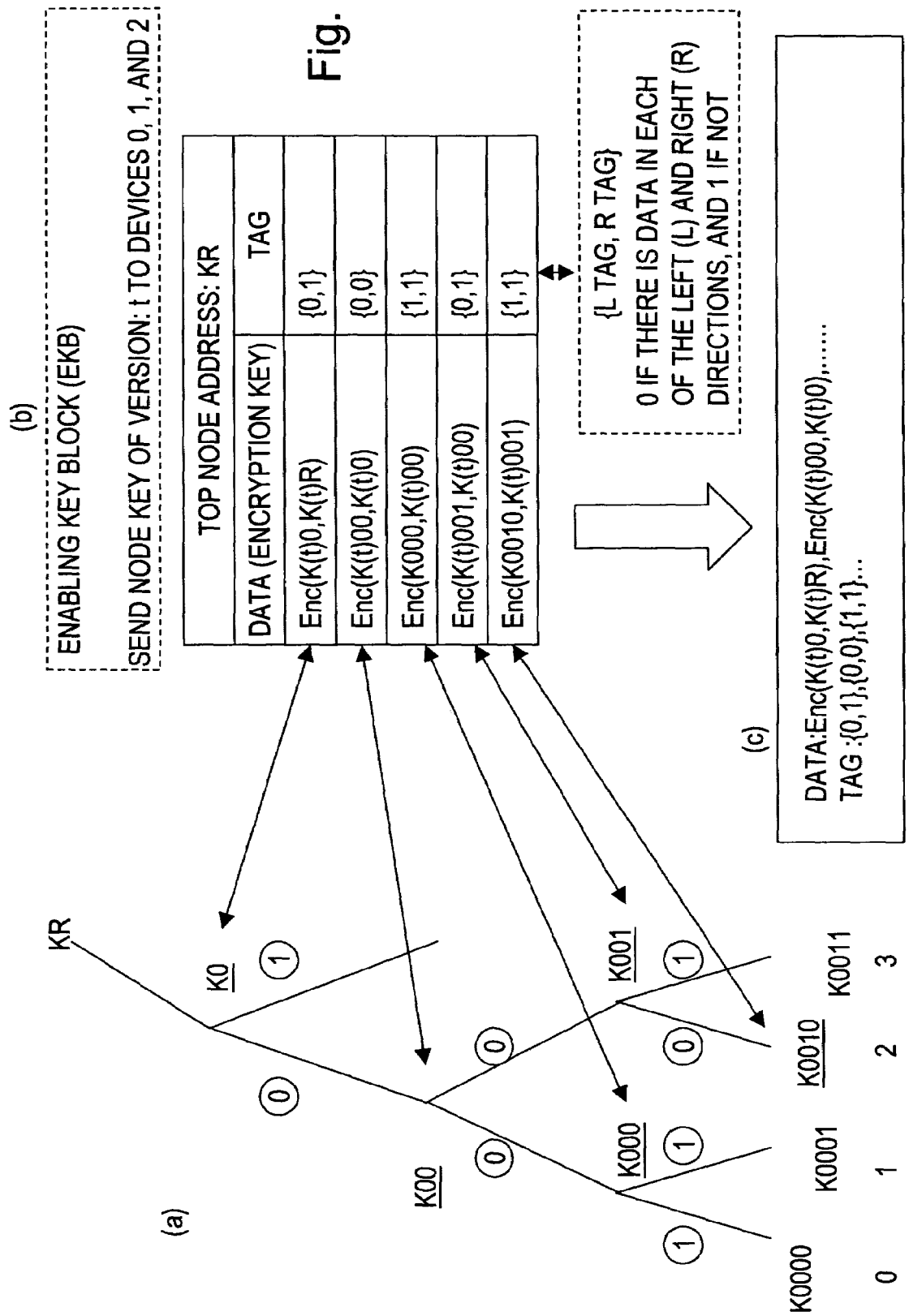
FIG. 11 illustrates the structure of a tag of the enabling key block (EKB).

A tag part 207 is a tag indicating the positional relationship between encrypted node keys, which are stored in the data part, and the leaf keys. The rule for assigning this tag is described with reference to FIG. 11. In FIG. 11, an example is shown in which, as data, the enabling key block (EKB) described in FIG. 8(A) is sent. The data at this time is as shown in Table (b) of FIG. 11. The address of the top node contained in the encryption key at this time is assumed to be a top node address. In this case, since the updating key K(t)R of the root key is contained, the top node address is KR. At this time, for example, the data Enc (K(t)0, K(t)R) of the highest stage is at the indicated position in the hierarchical tree shown in FIG. 11(a). Here, the next data is Enc (K(t)00, K(t)0) and is at a position to the lower left of the previous data in the tree. When there is data, the tag is set to 0, and when there is no data, the tag is set to 1. The tag is set as {left (L) tag, right (R) tag}. Since there is data to the left of the data Enc (K(t)0, K(t)R) of the highest stage, L tag=0, and R tag=1 because there is no data to the right. Hereafter, tags are set for all the data, and a data sequence and a tag sequence, shown in FIG. 11(c), are formed.

The tag is set to indicate which position of the tree structure data Enc (Kxxx, Kyyy) is positioned at. Since the key data Enc (Kxxx, Kyyy)... stored in the data part is merely data of a sequence of simply encrypted keys, it is possible to determine the position in the tree, of the encryption key stored as data by the above-described tag. The following data structure can be formed by using node indexes corresponding to the encrypted data without using the above-described tag, as in the structure described above with reference to FIG. 8, for example, 0: Enc (K(t)0, K(t)root)
00: Enc (K(t)00, K(t)0)
000: Enc (K ((t)000, K(T)00)

However, in the case of a structure using such indexes, data becomes redundant, and the amount of data increases, which is undesirable in a distribution via a network. When compared to this, by using the above-described tag as index data indicating the key position, it becomes possible to determine the key position with a lesser amount of data.

Referring back to FIG. 10, the EKB format will be described further. A signature 208 is an electronic signature placed by, for example, a management system having a key management center function, a content server, a license server, or a shop server, which has issued the enabling key block (EKB). The device receiving the EKB confirms that the enabling key block (EKB) is issued by a valid enabling key block (EKB) issuer by signature verification.

[6. Category Classification of Tree]

A description will now be given below of a structure in which an efficient key updating process, encryption key distribution, and data distribution are performed by classifying the hierarchical tree structure which defines node keys, etc., for each category of each device.

Figure 12:
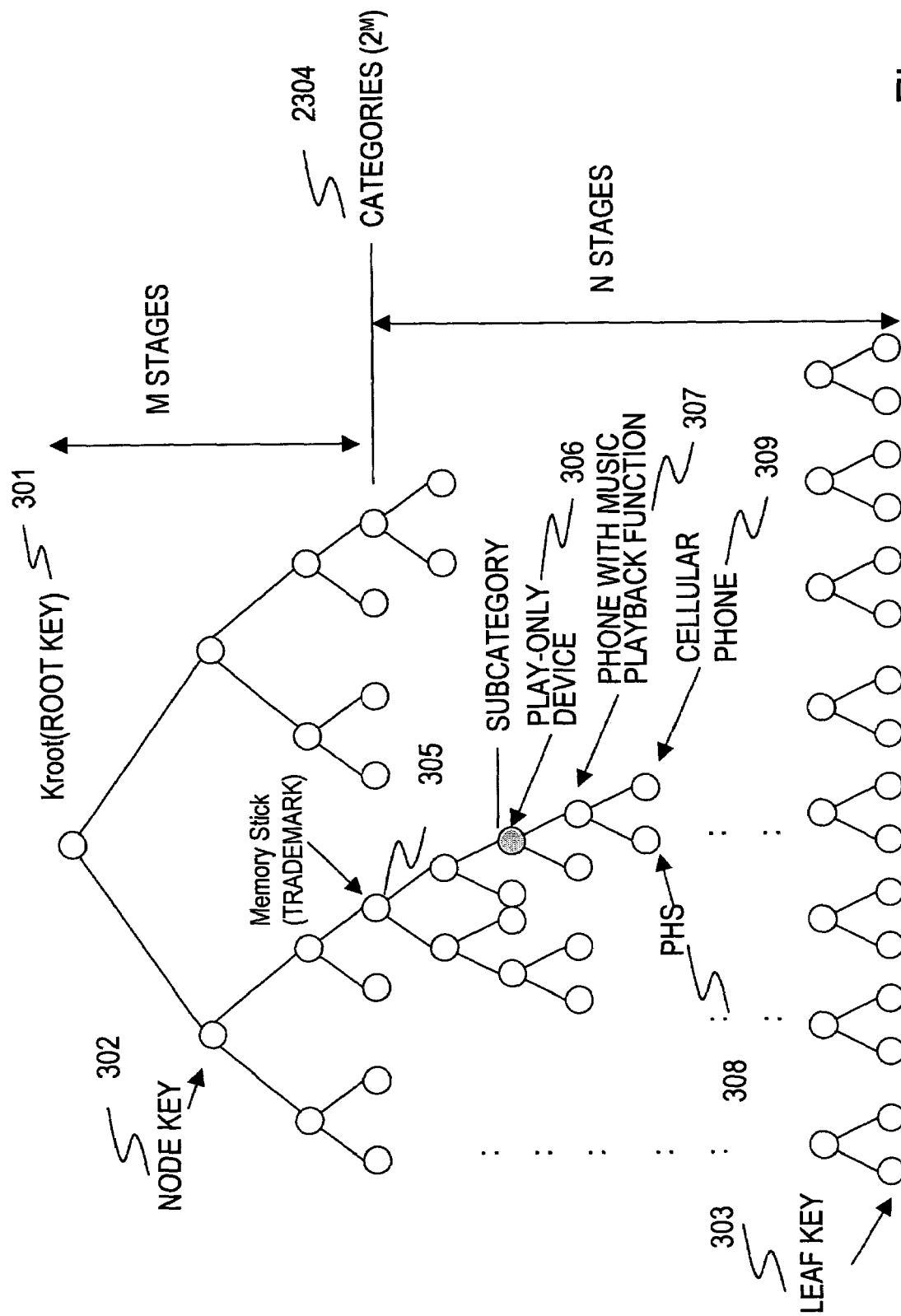
FIG. 12 illustrates category divisions in a tree structure.

FIG. 12 shows an example of the classification of categories in a hierarchical tree structure. In FIG. 12, a root key Kroot 301 is set at the highest stage of the hierarchical tree structure, a node key 302 is set at an intermediate stage lower than that, and a leaf key 303 is set at the lowest stage. Each device holds an individual leaf key, a series of node keys from the leaf key up to the root key, and the root key.

Here, as an example, a particular node at the M-th stage from the highest stage is set as a category node 304. That is, each of the nodes at the M-th stage is set as a device set node of a specific category. By setting one node of the M-th stage as the apex, hereinafter, the nodes and the leafs of the (M+1)th or lower stages are assumed to be the nodes and the leafs pertaining to the devices contained in that category.

For example, the category [Memory Stick (trademark)] is set at one node 305 of the M-th stage of FIG. 12, and the nodes and the leafs which are connected to this node or lower nodes are set as nodes and leafs which are dedicated to the category containing various devices using Memory Sticks. That is, the node 305 and lower nodes are defined as the nodes associated with the devices defined in the category of Memory Stick, and a set of leafs.

Furthermore, a stage that is several stages lower than the M-th stage can be set as a subcategory node 306. For example, as shown in the figure, at the node that is two stages lower than the category [Memory Stick] node 305, a node [play-only device] is set as a subcategory node contained in the category of devices using a Memory Stick. Furthermore, at the node 306 of the play-only device, which is a subcategory node, and lower nodes, a node 307 of a phone with a music playback function, contained in the category of the play-only device, is set, and at nodes lower than that, a [PHS] node 308 contained in the category of a phone with a music playback function and a [cellular phone] node 309 can be set.

Furthermore, the category and the subcategory can be set by not only the type of device, but also by nodes, which are individually managed by, for example, a maker, a content provider, a settlement organization, etc., that is, any units such as processing units, management units, or provided service units (hereinafter will be collectively referred to as "entities"). For example, if one category node is set as an apex node, which is exclusively used for a game device XYZ sold by a game device maker, it becomes possible to sell a game device XYZ, in which the node keys and the leaf keys at the stages of the apex and lower nodes are stored. Thereafter, for the process for distributing encrypted content or the process for distributing and updating various kinds of keys, an enabling key block (EKB) formed of the node keys and the leaf keys of the apex and lower nodes is generated and distributed so that data which can be used for only the devices of the apex and lower nodes can be distributed.

In this manner, as a result of forming the structure in which one node is assumed to be the apex and the lower nodes are set as the nodes associated with the category defined at the apex node or the subcategories, a structure becomes possible in which a maker, a content provider, etc., which manages one apex node of the category stage or the subcategory stage individually creates the enabling key block (EKB) in which that node is the apex, and the enabling key block (EKB) is distributed to the devices belonging to the apex and lower nodes, and key update can be performed without exerting an influence at all on the devices belonging to the nodes of the other categories which does not belong to the apex node.

Figure 13:
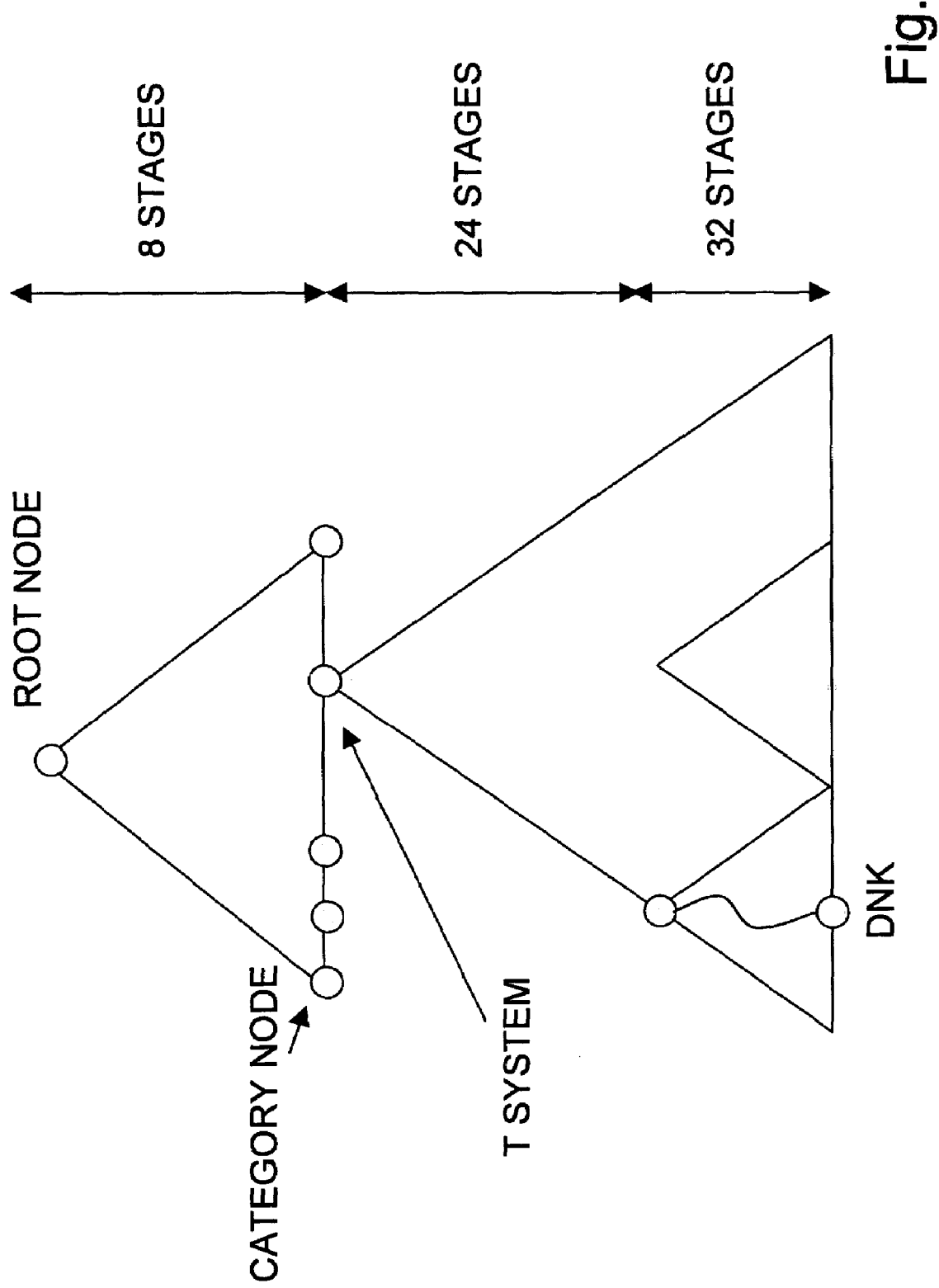
FIG. 13 illustrates category divisions in the tree structure.

For example, as shown in FIG. 13, key management is performed in the system of the tree structure. In the example of FIG. 13, nodes of 8+24+32 stages are formed as a tree structure, and the category is made to correspond to each node from the root node up to 8 lower-order stages. The category herein means, for example, the category of devices which use a semiconductor memory such as a Memory Stick, or the category of devices which receive a digital broadcast. Then, this system (referred to as a "T system") as a system for managing a license corresponds to one node among the category nodes.

That is, the keys corresponding to the nodes of 24 stages at the hierarchies lower than the node of the T system, are used for the service provider as a management entity such as a shop server or a license server, or used for services provided by a service provider. In the case of this example, this makes it possible to specify $2^{24}$ (approximately 16 megabytes) service providers or services. Furthermore, the hierarchies of the 32 stages of the lowest side makes it possible to specify $2^{32}$ (approximately 4 gigabytes) users (or user devices). The key corresponding to each node on the path from the nodes of the 32 stages of the lowest side to the node of the T system forms a device node key (DNK), and the ID corresponding to the leaf of the lowest stage is assumed to be a leaf ID.

For example, a content key such that content is encrypted is encrypted by an updated root key KR', and the updating node key of the higher-order hierarchy is encrypted using an updating node key of the nearest lower-order hierarchy and is placed in the EKB. The updating node key at the stage, which is one higher than the lowest end of the EKB, is encrypted by the node key or the leaf key at the lowest end of the EKB and is placed in the EKB.

By using one of the keys of the DNKs described in the service data, the user device decrypts the updating node key of the nearest higher-order hierarchy, which is described in the EKB distributed together with the content data, and by using the key obtained by decryption, decrypts the updating node key of the hierarchy higher than that, described in the EKB. By performing the above processes in sequence, it is possible for the user device to obtain an updating root key KR'.

In the manner described above, the tree category classification makes possible a structure in which one node is set as the apex, and the lower nodes are set as nodes associated with the category defined at the apex node or subcategories. Thus, a structure is realized in which a maker, a service provider, etc., which manages one apex node of the category stage or the subcategory stage individually creates the enabling key block (EKB) in which that node is an apex and distributes the enabling key block (EKB) to the devices belonging to the apex and lower nodes.

A further description is given of content distribution and usage form in which an EKB distribution structure is adopted by using an EKB distribution system by device management of the above-described tree structure.

Figure 14:
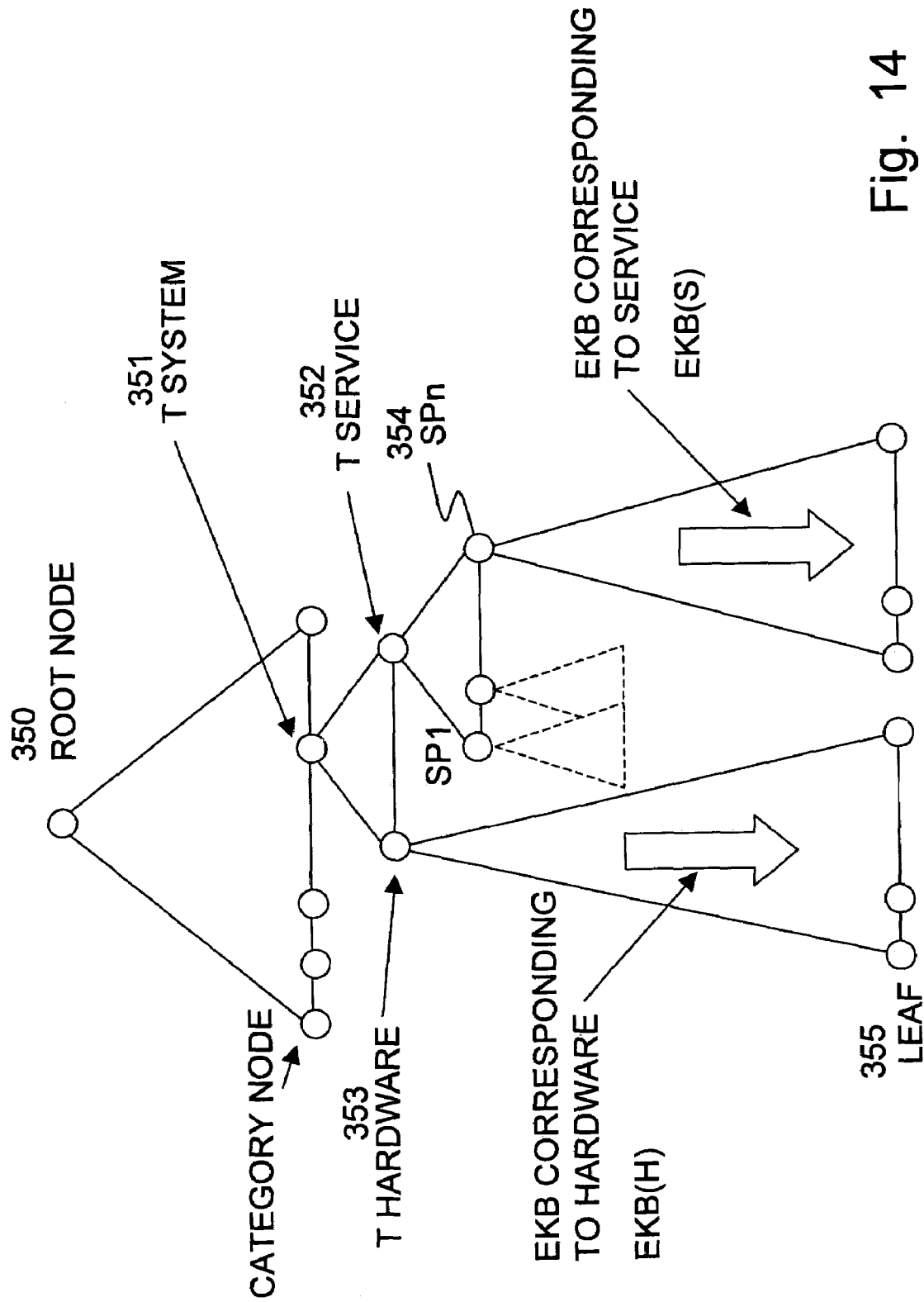
FIG. 14 illustrates a specific example of category divisions in the tree structure.

With reference to FIG. 14, two categories are described below. As shown in FIG. 14, a T system node 351 is set at a stage lower than a root node 350, and a T service node 352 and a T hardware node 353 are set at a stage lower than that. The tree in which the T hardware node 353 is the apex is a category tree in which the user device itself is set as a leaf 355, and EKB [EKB (H)] corresponding to hardware, which is issued for the object of a device, is distributed. On the other hand, the tree in which the T service node 352 is the apex is a category tree in which EKB [EKB (S)] corresponding to services, which is issued so as to correspond to a service provided to a user device, is distributed.

Both the EKB [EKB (H)] corresponding to hardware and the EKB [EKB (S)] corresponding to service have a DNK (Device Node Key) given to a device having an authorized right, that is, a key corresponding to each node on the path from the leaf up to the node of the T system, thus making it possible to decrypt each EKB.

[7. License Purchase and Content Playback Process]

A description will now be given of a license obtaining process, which becomes necessary when the client intends to use, that is, play back the recorded content of the second data recording field 12 of the information recording medium (disk) 10 shown in FIG. 1, that is, the encrypted content, and a content usage (playback) process performed on the basis of the obtained license.

Figure 15:
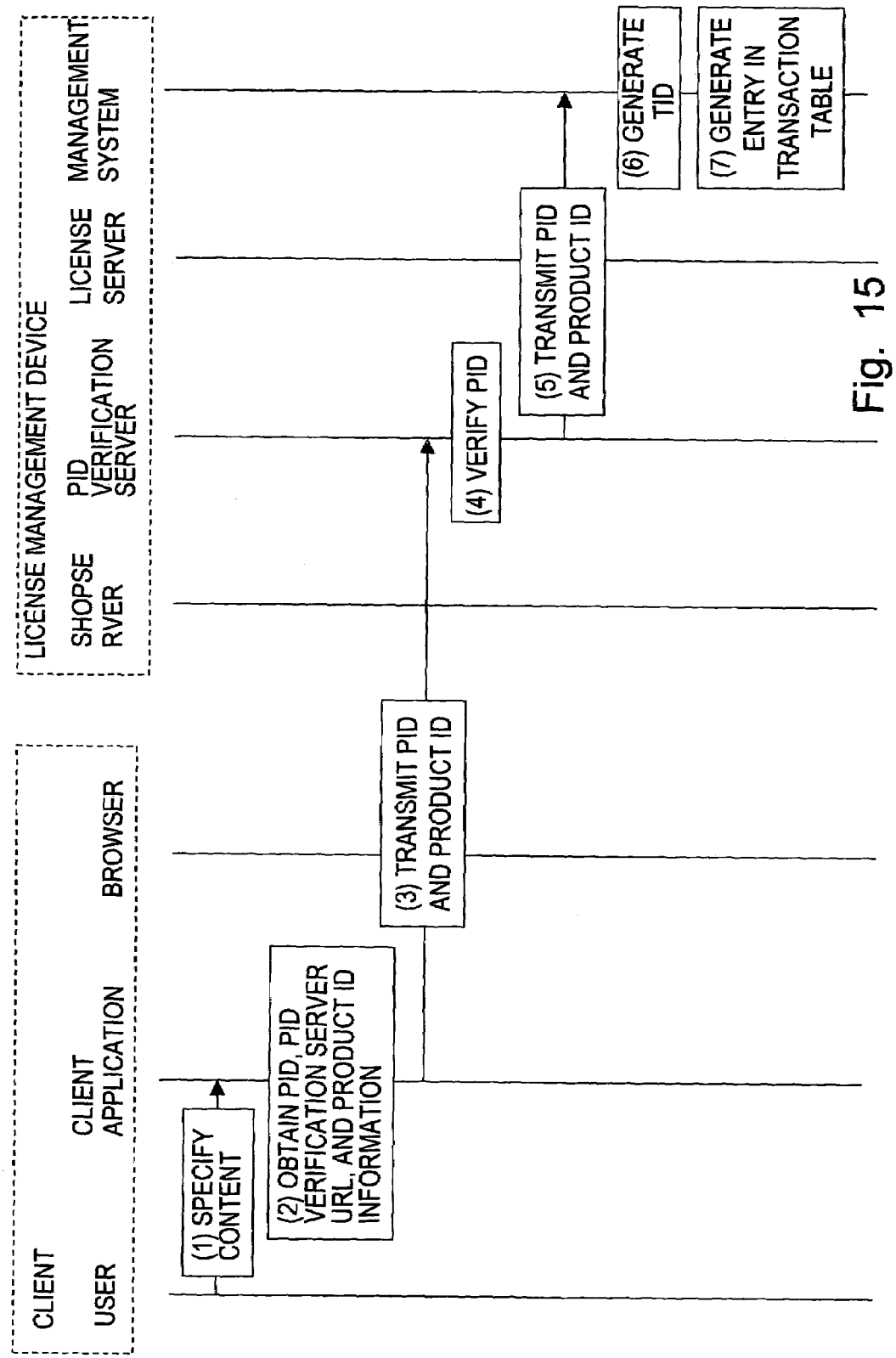
FIG. 15 shows a processing sequence (No. 1) between entities in the license obtaining process.

FIG. 15 shows the initial step of a communication sequence in a content purchasing process, which is performed between the client, such as a PC having a client application and a browser, and a shop server, a PID verification server, a license server, and a management system. The whole of the user, the client application, and the browser is collectively referred to as a "client", and the whole of the shop server, the PID verification server, the license server, and the management system is collectively referred to as a "license management apparatus". The processes shown in the sequence diagram will now be described. For the data communication among entities, transmission and reception are performed by performing an encryption process, for example, an SSL-based encryption process except when the communication path is ensured as a secure communication path.

Initially, on the client side, the user who intends to play back the recorded content of the second data recording field 12 of the information recording medium (disk) 10 shown in FIG. 1, that is, the encrypted content, specifies playback content (step (1)). However, as described with reference to FIG. 4, since an application is automatically executed as a result of a process for setting a CD in a PC, the specification of the content by the user corresponds to a process for setting, by the user, an information recording medium, such as a CD, in the drive (for example, a CD-RW drive).

The client application in the information processing apparatus, such as the PC, reads from the information recording medium such as the set CD, the information of the PID (see FIG. 2), the information of the PID verification server URL, and the information of the product ID (step (2)). As described above, the PID is data, which is recorded in the PID (Postscribed-ID) recording area 13 of the information recording medium 10 shown in FIG. 1, contains media ID which is given as a unique identifier (ID) for each disk in a predetermined disk set unit, such as a title unit, an album unit, a category unit, and a manufacturing lot unit, as well as version information, and to which a MAC as a data alteration verification code is added. The information of the PID verification server URL and the information of the product ID, as described with reference to FIG. 4, is information stored in the definition file in the data file stored in the second data recording field 12.

Next, the client application transmits the obtained PID and product ID to the PID verification server on the basis of the obtained PID verification server URL (step (3)).

When the PID and the product ID are received from the client, the PID verification server performs a MAC verification process as a process for verifying whether or not the received PID has been altered (step (4)). The MAC verification process is performed as a process in which, for example, the MAC generation process described with reference to FIG. 3 is performed based on the received message (PID), and a determination is made as to whether or not the generated MAC value matches the MAC value added to the received PID.

The key required to generate the MAC is obtained from the album master table by the PID verification server. An example of the structure of the album master table is shown in FIG. 16. The album master table is formed as a table in which a product ID, a PID key as key information used for MAC verification of the PID, title information, and the artist information corresponding to the content stored in the disk are made to correspond to one another.

Based on the product ID received from the client, the PID verification server obtains a PID key as a MAC verification key from the album master table shown in FIG. 16, generates a MAC, and performs a process for verifying the alteration of the PID received from the client. When the generated MAC value differs from the MAC value which is added to the received PID, it is determined that the PID data has been altered, an error message is transmitted to the client, and the subsequent license obtaining process is not performed.

When the generated MAC value matches the MAC value which is added to the received PID, it is determined that the PID data has not been altered, and the PID verification server transmits the PID and the product ID to the management system (step (5)). When the PID and the product ID are received from the PID verification server, the management system generates, based on, for example, a random number, a transaction ID (TID) as identification data for a series of processing sequences (transactions) (step (6)).

Furthermore, the management system generates a transaction table entry, in which the product ID, the PID, and the price of the license, that is, the content usage price information, are made to correspond to the generated transaction ID, and stores the entry in the table (step (7)). An example of the structure of the transaction table is shown in FIG. 17.

As shown in FIG. 17, the transaction table is a table in which the product ID, the media ID in the PID, and the content usage price as the price of the license are stored so as to correspond to the transaction ID as identification data for a series of processing sequences (transactions).

The content usage price as the price of the license may be fixed in such a manner as to correspond to content. Alternatively, it may be set as a price which varies according to the number of uses of the content, that is, the number of purchases of the license.

As described above, the combination of the product ID and the PID (media ID) is global unique identification data. A table in which the combination of the product ID and the PID (media ID) is made to correspond to the number of purchases, that is, the number of license issued based on a content usage request from the client, for example, a disk table shown in FIG. 18(a), is set. Furthermore, an album price master table, shown in FIG. 18(b), in which the product ID, the number of purchases, and the price are made to correspond to one another, is created, and this table is stored and managed in the database.

In a case where the disk table and the album price master table, shown in FIG. 18, are set and a content usage request occurs from a new client, the number of past purchases is checked based on the product ID and the PID (media ID) by referring to the disk table, and the price to be presented is determined based on the product ID and the number of purchases by referring to the album price master.

For example, when the product ID and the PID (media ID), which are presented from the client, match [P-1, PID1-001] of the first entry shown in FIG. 18(a), it is determined that the number of past purchases is one, and the purchase request at this time is a second time. Thus, the set price of the product ID (=P-1) and of the number of purchases (=2) of the album price master table, shown in FIG. 18(a), that is, ¥300, is made the presentation price. Furthermore, an updating process for increasing by [+1] the number of purchases of [P-1, PID1-001] of the first entry of the disk table is performed.

The disk table updating process and the price setting process may be performed in the management system on the license management apparatus side. Alternatively, these processes may be performed in any one of the shop server, the PID verification server, and the license server. That is, in one of the servers, based on the identification data involved with a license obtaining request received from the client, the content usage information of the client is obtained from the disk table; based on the content usage information, the license providing condition information is obtained from the album price master table; and based on the obtained license providing condition information, the license providing condition for the client is determined. In one of the servers or the management system, the processing program for performing the license providing condition determination process is stored in the storage section, and the control section, such as the CPU, functions as a license providing condition determination processing means.

The price setting can take various forms. A structure is possible such that, the more the number of purchases of the same content from the client is increased, the more the price is decreased, and a purchasing process of a fixed number of times or more, for example, three or more times, is set free of charge.

In addition to the form in which the price is changed according to the number of purchases, services are changed variously, for example, when a license with a time limit is set, the setting period is set as a long period according to the number of purchases. Alternatively, various services in accordance with the number of purchases can be provided, such as content being provided free of charge according to the number of purchases.

The price information in the entry of the transaction table (FIG. 17) in the management system is a price set by referring to the disk table and the album price master table shown in FIG. 18. This price setting process may be performed by, for example, the PID server, and the price setting information may be transmitted to the management system. Alternatively, necessary information may be transmitted from the management system to the shop server or the license server, the price setting may be performed in the shop server or the license server, and the set price information may be transmitted to the management system. In addition, the management system itself may determine the price by referring to the disk table and the album price master table, shown in FIG. 18.

Figure 19:
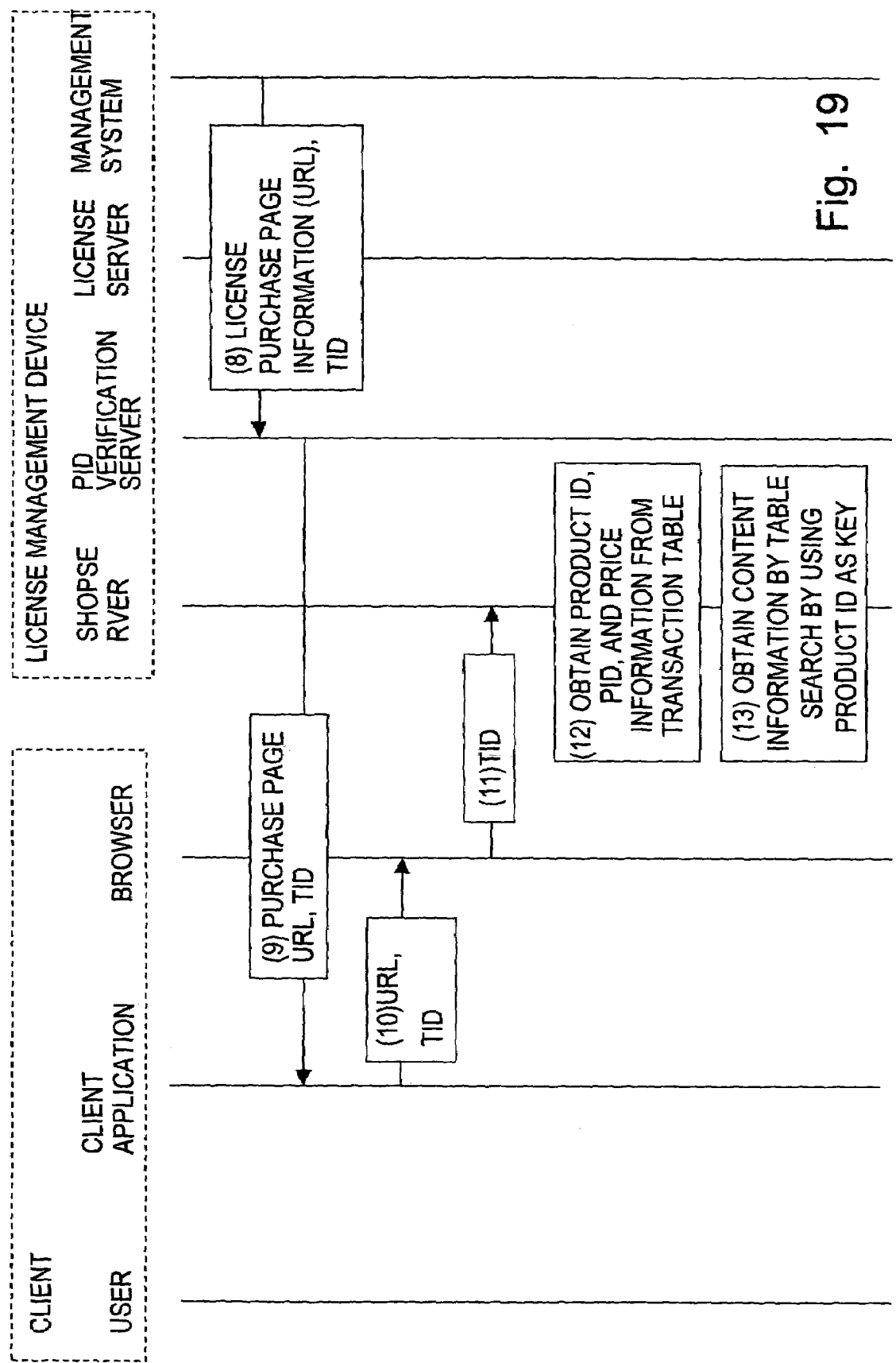
FIG. 19 shows a processing sequence (No. 2) between entities in the license obtaining process.

The processing following the sequence diagram of FIG. 15 will now be described with reference to FIG. 19. In the management system, when the generation of entries of the transactions (FIG. 17) is completed, the management system transmits the license purchase page information (URL), which is necessary to play back content, together with the transaction ID (TID) to the PID verification server (step (8)), and the PID verification server transmits the license purchase page information (URL) and the transaction ID (TID) to the client application (step (9)).

The client application starts up the browser on the basis of the received URL (step (10)) so as to display the license purchase page presented by the shop server, and transmits the transaction ID (TID) to the shop server (step (11)).

Based on the received transaction ID (TID), the shop server obtains, from the transaction table (see FIG. 17), the product ID, the PID (media ID), and the price information corresponding to the TID (step (12)). The shop server further obtains content title information from the track table, shown in FIG. 20, in which content No., the product ID, and the content title are made to correspond to one another. Furthermore, based on the product ID, the shop server obtains content information, such as the corresponding album title and artist name from the album master table (see FIG. 18(*b*)) (step (13)). Based on the obtained information, the shop server generates a purchase page to be presented to the client. The shop server includes Web page generation and presentation means, and the purchase page is generated as a Web page and is presented to the client. An example of the purchase page structure will be described in detail later with reference to the drawings.

Figure 21:
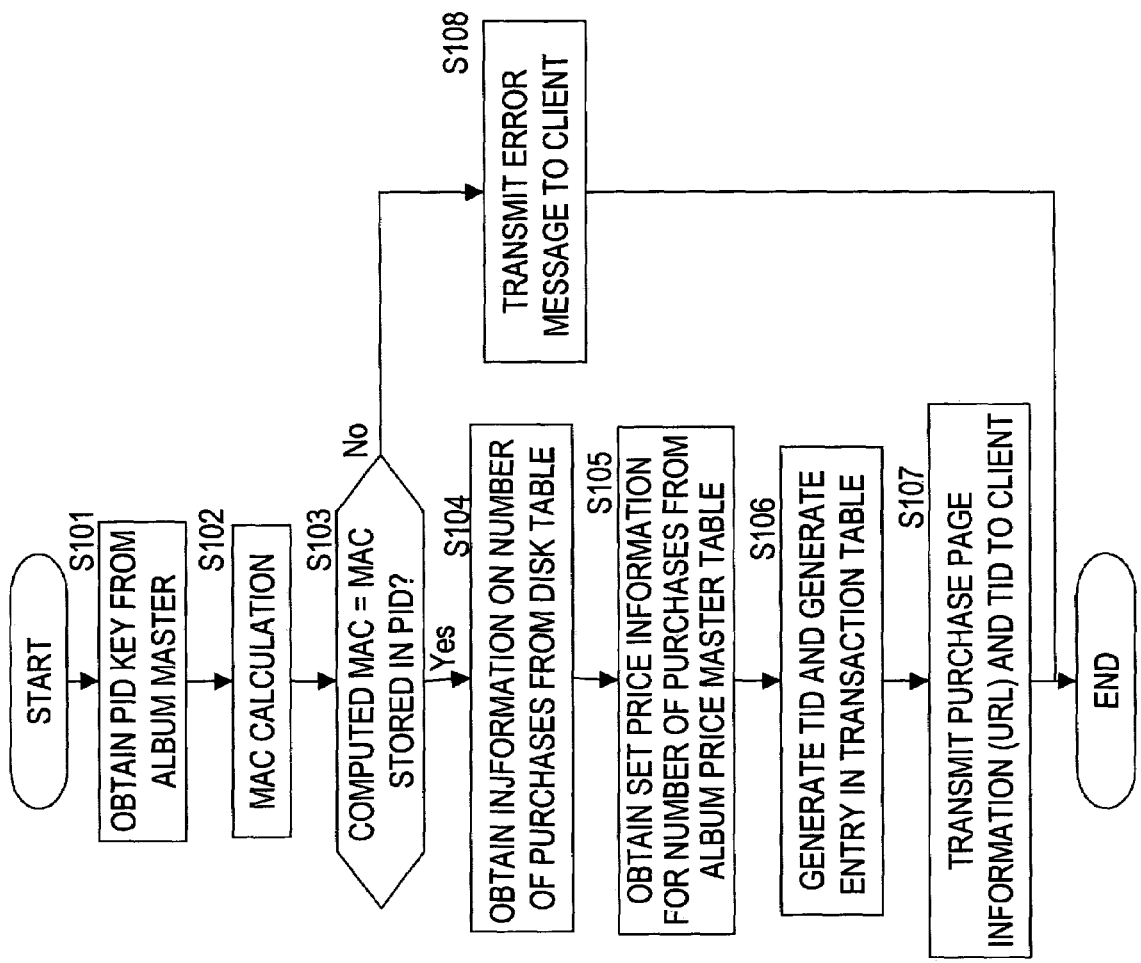
FIG. 21 is a flowchart illustrating processing on the license providing side in the license obtaining process.

A description will now be given, with reference to the flowchart in FIG. 21, of a series of processes on the license management apparatus side from when the PID and the product ID are received from the client until a purchase page is transmitted to the client.

Initially, in step S101, based on the product ID received from the client, the corresponding PID key is obtained from the album master table (see FIG. 16). Then, in step S102, using the PID key, a MAC value for the received PID is calculated.

In step S103, a process for comparing the calculated MAC value with the MAC value stored in the received PID is performed. If they do not match, it is determined that the received PID has been altered, and the process proceeds to step S108, where an error message is transmitted to the client, and the processing is completed.

If the calculated MAC value is equal to the MAC stored in the PID, it is determined that the received PID has not been altered. Next, in step S104, based on [product ID, PID (media ID)] received from the client, data on the number of purchases is obtained from the disk table (see FIG. 18(*a*)). Then, in step S105, based on the product ID, the set price corresponding to the number of purchases is obtained from the album price master table (see FIG. 18(*b*)).

Next, in step S106, a process for generating a TID is performed, and then an entry of the transaction table (see FIG. 17) in which the product ID, the PID (media ID), and the price are made to correspond to the TID is set.

Next, in step S107, content information is obtained from the album master and the track table, price information is obtained from the transaction table, a purchase page having the price and the content information is generated, and this page, together with the TID, is transmitted to the client. The process of each step, shown in FIG. 21, is performed as a coordinated process in the PID verification server on the license management apparatus side, the management system, and the other entities.

Figure 22:
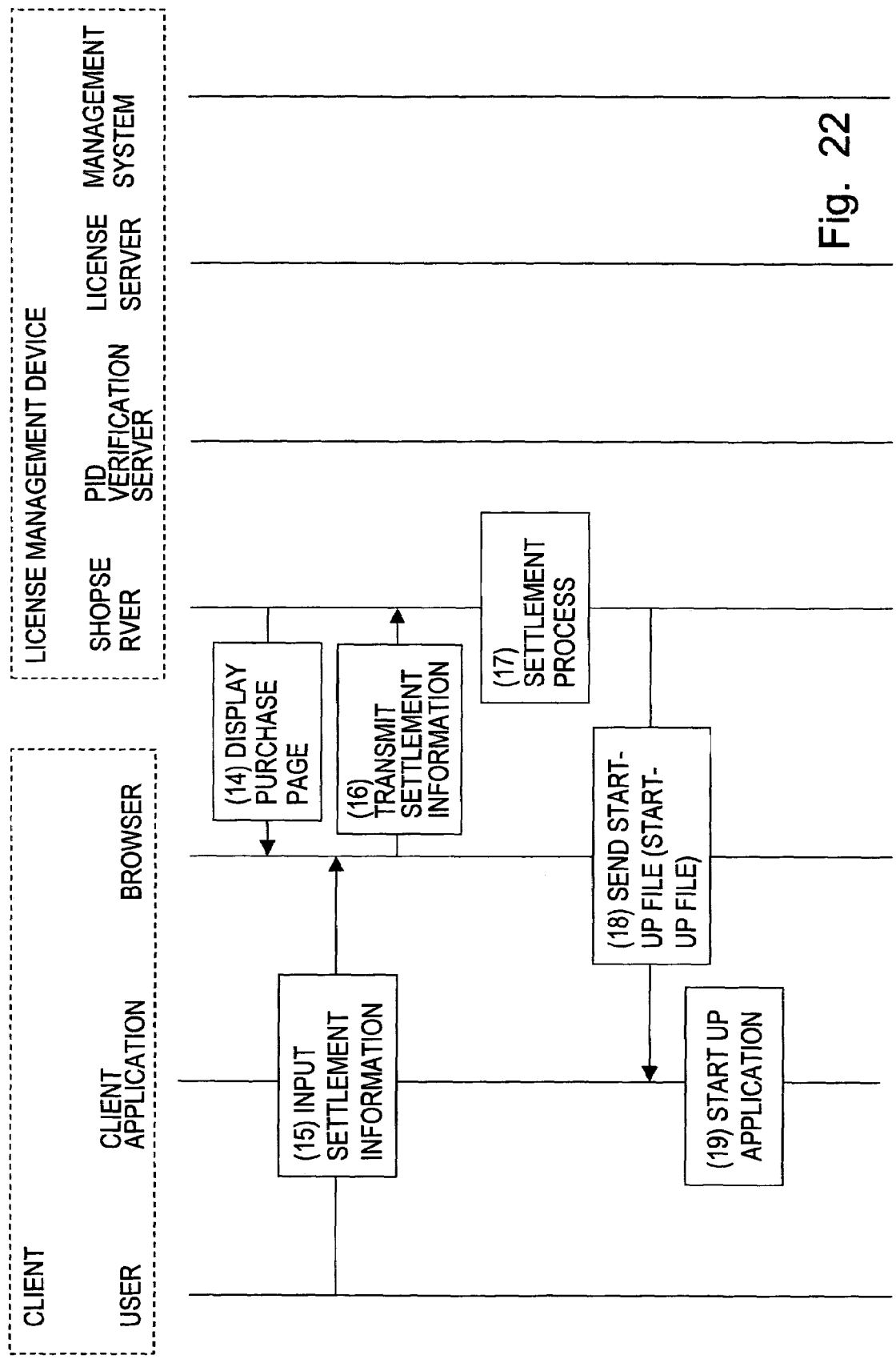
FIG. 22 shows a processing sequence (No. 3) between entities in the license obtaining process.

The license providing process following the processing sequence of FIG. 19 will now be described with reference to the processing sequence diagram of FIG. 22. The shop server generates a purchase page on the basis of the above-described processing and presents it to the browser of the client (step (14)).

Figure 23:
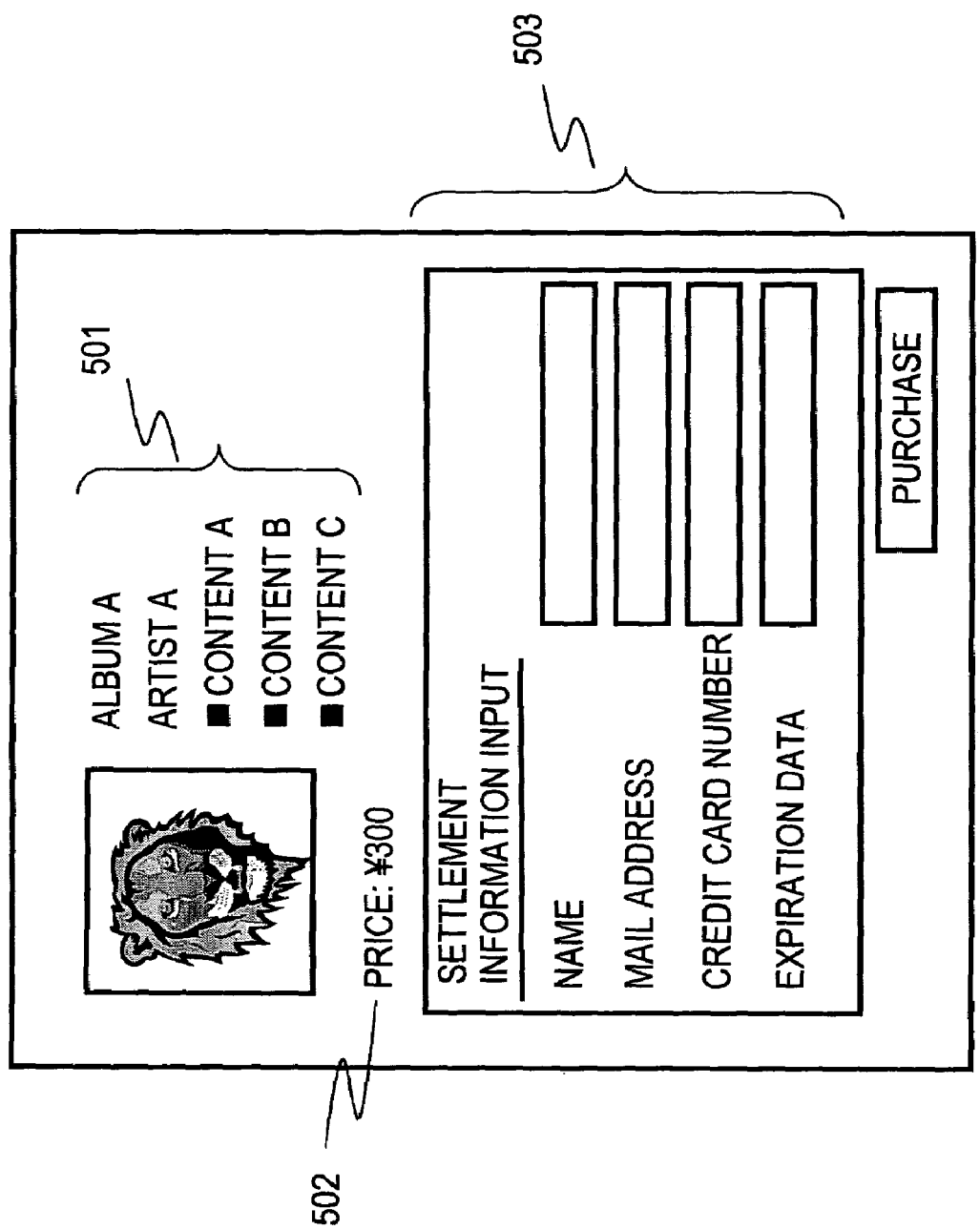
FIG. 23 shows an example of a purchase page presented to a client in the license obtaining process.

An example of the structure of the purchase page presented to the browser of the client is shown in FIG. 23. The purchase page contains content information 501, price information 502, and a user input field 503 indicating input request item information for the user. The content information 501 is information of the encrypted content recorded in the second data recording field of the information recording medium (see FIG. 1), such as a CD, which is set in the client. For the price information 502, a price which is set according to the number of purchases is shown when the setting is changed according to the number of purchases in the manner described above.

The client displays a purchase page shown in FIG. 23, inputs data, which is necessary for a settlement process, such as the name, the mail address, the credit card number, the expiration data of the credit card, and so on (step (15)), and transmits the input information to the shop server via the browser (step (16)).

The shop server receiving the settlement information performs a settlement process on the basis of the received information (step (17)). More specifically, a connection is made with a settlement organization, for example, a financial organization which provides an online settlement process as a service, and processes of determining whether or not the credit card number presented by the client is effective and valid and of determining whether or not there is an account balance which can be settled are performed. After that, at the settlement organization, an amount of money corresponding to the purchase money is withdrawn from the specified account or a transfer process is performed, and the shop server-receives a settlement completion message from the settlement organization.

When the settlement process is completed, with respect to the client, the shop server creates a start-up file for starting up a content usage program (a playback process, etc.) in the client application, and sends it to the client application via the browser of the client.

An example of the start-up file will be described with reference to FIG. 24. A start-up file 551 contains the transaction ID (TID), which was previously generated by the management system, the content ID (CID) to be used and played back by the client, the usage right information (UID)

generated by the management system, the service ID, the license server URL, and the shop server URL.

The client application starts up the application in response to the start-up file received from the shop server (step (19)).

In an application start-up process performed by the client application, first, a determination is made as to whether or not the service data corresponding to the service ID, which is set in the start-up file (see FIG. 24), is stored in the information processing apparatus serving as the client system.

The service data is received from the license server when the client wants to receive various kinds of services, for example, content usage services, and is data for recognizing, for example, the collective service usage right of services provided by a specific service provider. FIG. 25(*a*) shows an example of the data structure of the service data.

As shown in FIG. 25(*a*), service data 570 contains the leaf ID unique to the client, which is set in the EKB distribution tree, the service ID serving as a service identifier, as well as data E (Kroot, DNK) such that the device node key (DNK) is encrypted using the root key (Kroot). In order to receive the service data, the client requires that a registration process for the license server be performed.

Figure 26:
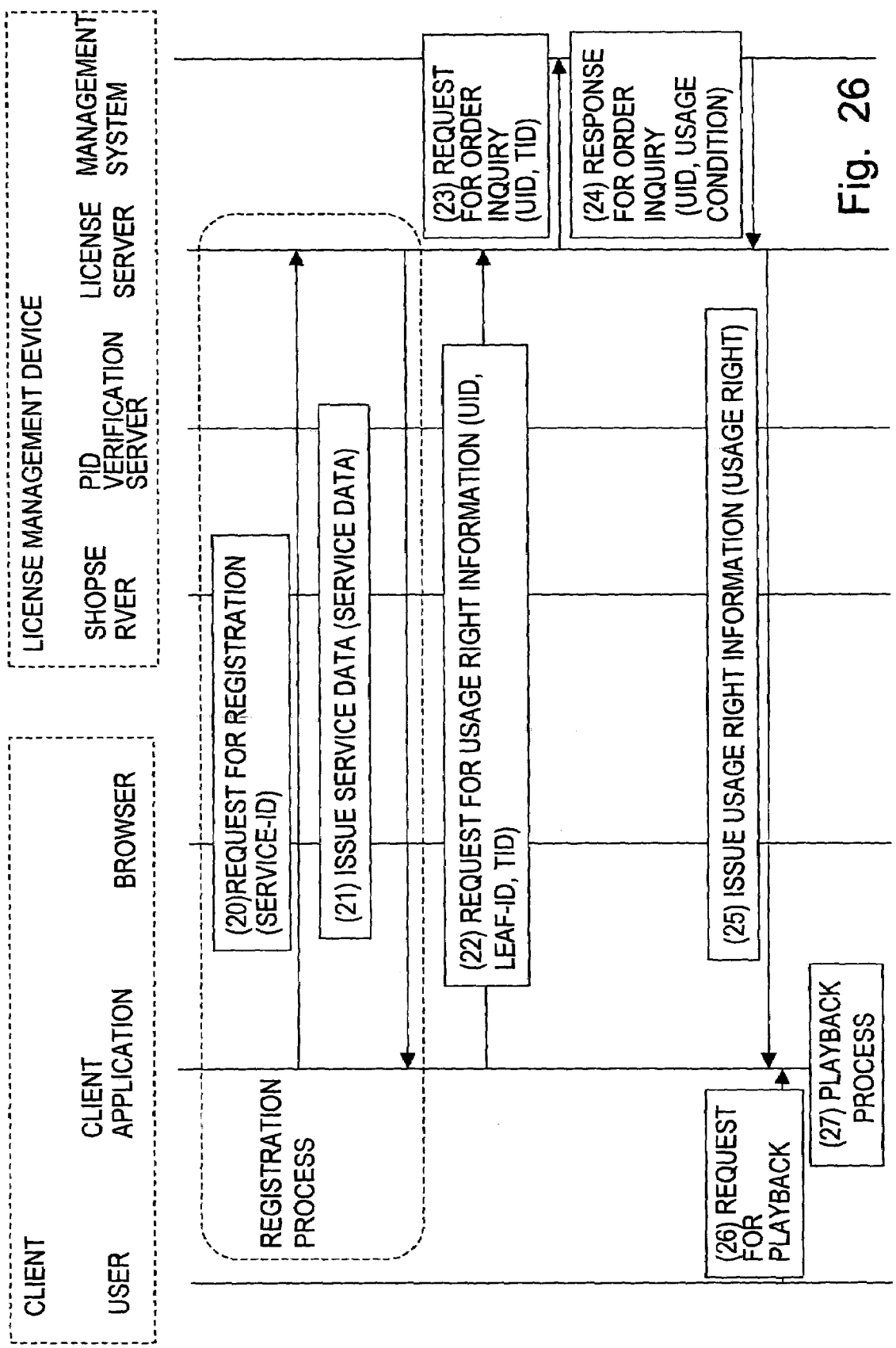
FIG. 26 shows a processing sequence (No. 4) between entities in the license obtaining process.

The registration process corresponds to the processes of processing steps (20) and (21), shown in FIG. 26. When it is determined that the client does not hold the service data corresponding to the service ID, the registration processes of the processing steps (20) and (21) are performed, so that service data is received from the license server. This registration process needs not to be performed when the client already holds the service data corresponding to the service ID.

The client for which the registration process is performed then obtains the usage right information as a license corresponding to the usage (playback) content from the license server.

FIG. 25(*b*) shows an example of the data structure of the usage right information. As shown in FIG. 25(*b*), in usage right information 571, usage right information ID serving as a usage right information identifier, a time stamp serving as issuance date and time information, and the leaf ID unique to the client are stored. Furthermore, when the usage right information corresponds to the content, the content ID and the content type information for the object of usage conditions are stored. For the content IDs, the individual content IDs of the encrypted content stored in the second data storage area of the information recording medium shown in FIG. 1 may be listed, or the product ID may be set.

The content 572, that is, the recorded content of the second data recording field 12 of the information recording medium 10 shown in FIG. 1, is recorded in the disk in such a manner as to have content data Enc (Kc, Content), which is encrypted using a content key [Kc], content key data Enc (Kroot, Kc), which is encrypted using a root key [Kroot], an EKB, which is decrypted by only the user having a valid usage right and from which the root key [Kroot] can be obtained, and the service ID.

A description will now be given, with reference to the sequence diagram in FIG. 26, of the processing sequence of obtaining usage right information, which is performed as a license obtaining process.

The client transmits a request for obtaining the usage right information (usage right) corresponding to the content to be played back or used to the license server (step (22)). This request contains the usage right information (UID) contained in the start-up file (see FIG. 24) which was previously from the shop server, the leaf ID serving as client identification data, and the transaction ID (TID) contained in the start-up file (see FIG. 24) which was previously from the shop server.

When the request for obtaining the usage right information (usage right) is received, the license server performs an order inquiry process (step (23)) with respect to the management system. This request contains the usage right information ID (UID) and the transaction ID (TID). The management system receiving the order inquiry transmits to the license server, response information as an order inquiry response, in which the usage conditions corresponding to the usage right information ID (UID) are set (step (24)).

The license server receiving the response information generates usage right information (usage right) in which content usage conditions are set, and issues it to the client (step (25)). The content usage conditions are formed as the number of playbacks of content, the expiration data, and permission information of various processes such as copying and check-out processes for external devices.

With regard to the content which was previously received from the content, it becomes possible for the client receiving the usage right information (usage right) to use content under the usage condition recorded in the usage right information (usage right). When a content playback request in which the content ID (CID) and the usage right information (usage right) ID are specified occurs from the user (step (26)), the client application performs content playback in accordance with the usage conditions (step (27)).

Figure 27:
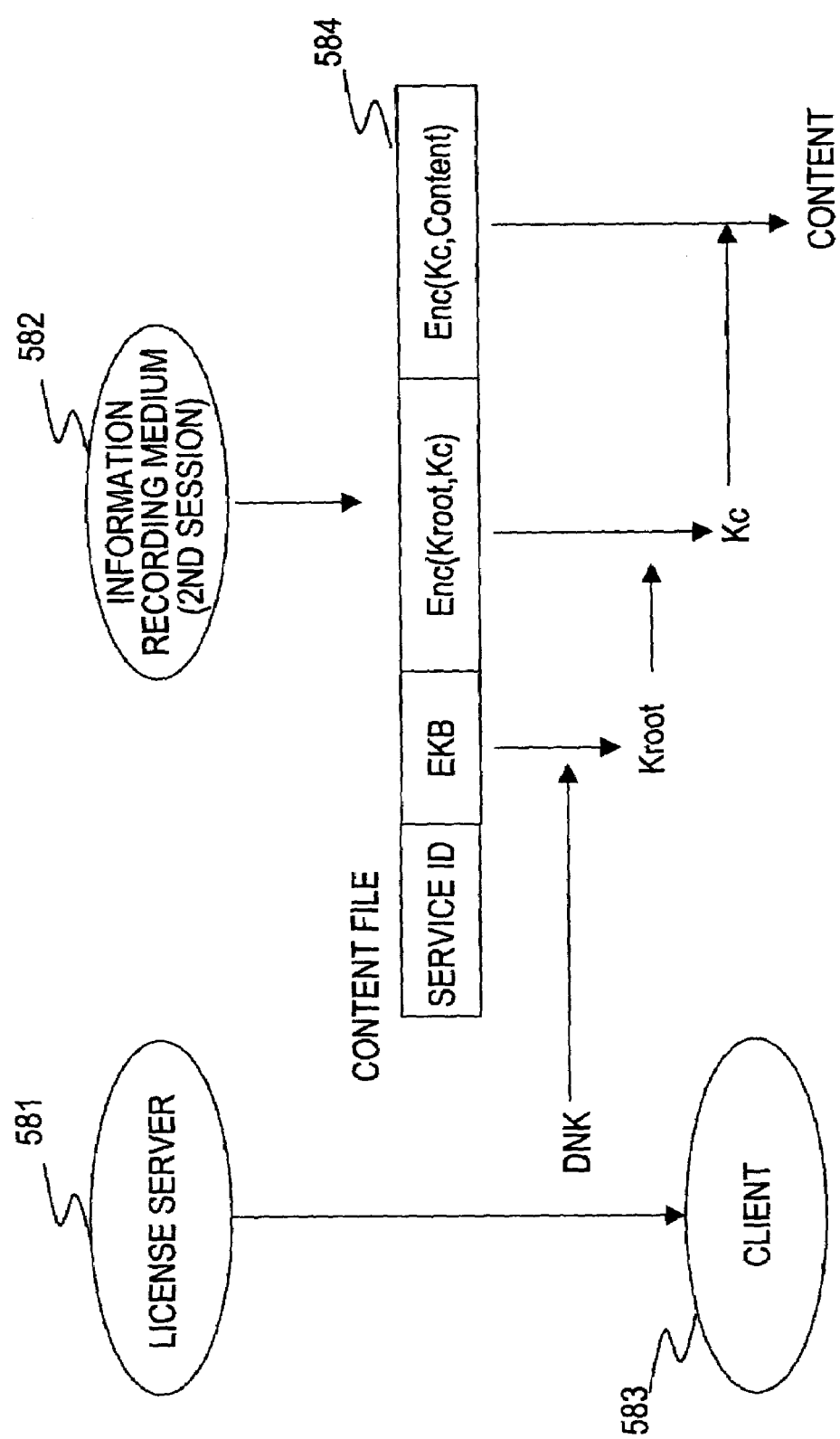
FIG. 27 illustrates the overview of a content playback process.

A description will now be given, with reference to FIG. 27, of the procedure of a basic content playback process. A content file 584 containing encrypted content is read from a second data storage area (2nd session) 582 of the information recording medium shown in FIG. 1. Service data and usage right information (usage right), serving as a license, are provided from a license server 581 to a client 583. By using the service data and the usage right information (usage right), a process for decrypting the encrypted content in the content file 584 is performed.

The content contained in the content file 584 is encrypted by a content key Kc (Enc (Kc, Content), and the content key Kc is a key obtained from the root key Kroot which can be obtained from the EKB.

The client 583 obtains a device node key (DNK) from the service data received from the license server, and obtains the root key Kroot by decrypting the EKB of the content file on the basis of the obtained DNK. Furthermore, the client 583 obtains a content key Kc by decrypting Enc (Kroot, Kc) by using the obtained root key Kroot, obtains the content by performing a process for decrypting the encrypted content Enc (Kc, Content) by the obtained content key Kc, and plays back the content.

A description will now be given, with reference to FIG. 28, of the details of the content playback process which is made to correspond to the service data and the usage right information (usage right).

Figure 28:
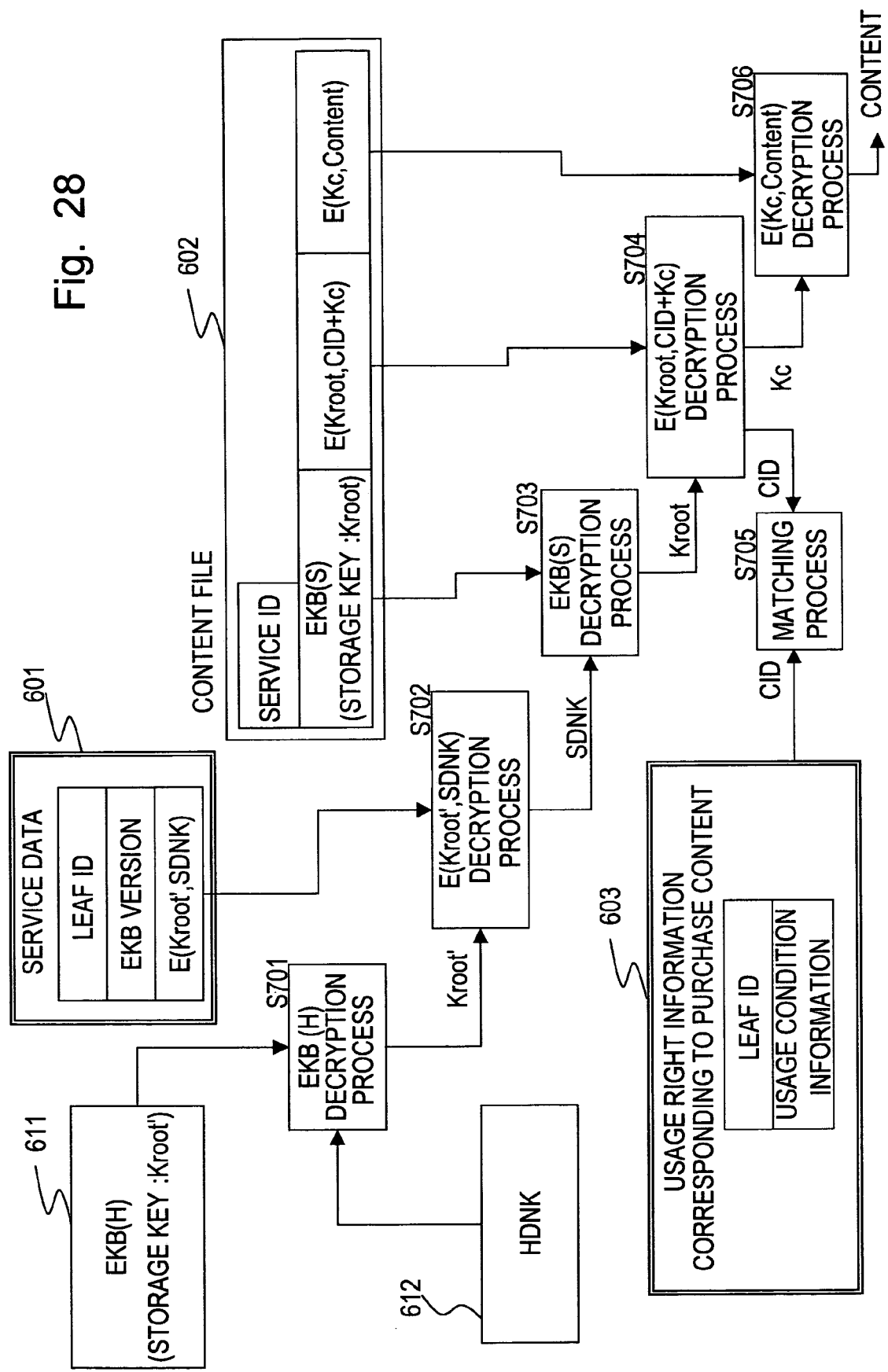
FIG. 28 illustrates examples of content decryption and usage processes using an enabling key block (EKB).

FIG. 28 is an illustration of a content usage processing sequence based on a content decryption process using EKB [EKB (H)] corresponding to hardware and EKB [EKB (S)] corresponding to software.

Service data 601 and usage right information 603, shown in FIG. 28, are data received from the license server, and an encrypted content file 602 is data read from the second data storage area (2nd session) of the information recording medium shown in FIG. 1. The service data 601 has stored therein a leaf ID serving as a leaf identifier, the version of the EKB to be used, and data E (Kroot', SDNK) such that a device node key (SDNK) corresponding to service, which is required to decrypt EKB [EKB (S)] corresponding to service, is encrypted by the root key Kroot', which is set in such a manner as to correspond to the category tree corresponding to hardware.

The encrypted content file 602 is a file containing EKB [EKB (S)] corresponding to service, in which the root key Kroot set in such a manner as to correspond to the category tree corresponding to service is stored; data E (Kroot, CID+Kc) such that the content ID (CID) and the content key (Kc) used for content encryption and decryption processes are encrypted; and data E (Kc, Content) such that content (Content) is encrypted by the content key Kc.

Furthermore, the usage right information 603 is data having stored therein the leaf ID and the content usage condition information. The content usage condition information includes various usage conditions, such as the usage period, the number of uses, a copy limitation, etc., which are set in such a manner as to correspond to the content. The user device receiving the usage right information 603 stores the usage right information as security information corresponding to the content or stores the usage right information as the index data of the content in an AV index file set in a playback device (a PC, etc.).

For example, in a user device, such as a PC, which does not have large-capacity storage means and in which the processing performance of the processor is high, usage right information can be stored as security information corresponding to the content. It is preferable that all the usage right information be stored so that, when content is used, a process in which all the usage right information is referred is performed to. On the other hand, in a user device, such as a portable device (PD), which does not have large-capacity storage means and in which the processing performance of the processor is low, processing is possible in which the usage right information 403, which is formed of selected information, is stored in an AV index file serving as index data of the content, and a process is performed such that the usage right information in the AV index file is referred to.

In step S701 shown in FIG. 28, the user device performs a process for decrypting an EKB (H) 611 corresponding to hardware by using a device node key (HDNK) 612 corresponding to hardware, thus obtaining from the EKB (H) 611 a root key Kroot' set in such a manner as to correspond to the category tree corresponding to hardware. The process for the EKB using the DNK is a process in accordance with the method described above with reference to FIG. 9.

Next, in step S702, by using the root key Kroot' extracted from the EKB (H), a process for decrypting encrypted data E (Kroot', SDNK) in the service data 601 is performed, thus obtaining a device node key (SDNK) used for the process (decryption) of the EKB [EKB (S)] corresponding to service.

Next, in step S703, by using the device node key (SDNK) extracted from the service data, a process (decryption) for the EKB [EKB (S)] corresponding to service, which is stored in the encrypted content file 602, is performed, thus obtaining a root key Kroot set in such a manner as to correspond to the category tree corresponding to service, which is stored in the EKB [EKB (S)] corresponding to service.

Next, in step S704, by using the root key Kroot extracted from the EKB [EKB (S)] corresponding to service, a process for decrypting encrypted data E (Kroot, CID+Kc), which is stored in the encrypted content file 602, is performed, thus obtaining a content ID (CID) and a content key (Kc).

Next, in step S705, a process of matching (comparing) the content ID (CID) extracted from the encrypted content file 602 with the content ID stored in the usage right information is performed. When it is confirmed in the matching process that the content can be used, in step S706, by using the content key (Kc) extracted from the encrypted content file 602, the encrypted content E (Kc, Content) stored in the encrypted content file 602 is decrypted to play back the content.

As described above, the EKB [EKB (H)] corresponding to hardware serving as the EKB corresponding to the category tree set in such a manner as to correspond to hardware as a content usage device, and the EKB [EKB (S)] corresponding to software serving as the EKB corresponding to the category tree set in such a manner as to correspond to content using services are individually provided to the user. Therefore, only the user having a valid DNK with respect to each EKB can use the service.

The DNK for decrypting the EKB [EKB (S)] corresponding to service, that is, SDNK, can be provided as the service data 601 corresponding to the content, and the SDNK is encrypted using the root key Kroot' set in such a manner as to correspond to the category tree corresponding to hardware, which can be obtained by only a device having a valid DNK corresponding to hardware, that is, HDNK. Therefore, only the user device having a valid HDNK can obtain the SDNK and can use the service.

In using content, a process for matching the content identifier (CID) obtained from the encrypted content file 602 with the CID obtained from the usage right information is performed. Therefore, it becomes possible to make the fact that the usage right information 603 is obtained and the CID information is stored indispensable conditions for the content playback process, and content usage in accordance with the usage conditions is realized.

In the foregoing, the present invention has been described in detail while referring to the specific embodiments. However, it is self-explanatory that a person skilled in the art can modify or substitute the embodiments without departing from the spirit and the scope of the invention. That is, the present invention has been disclosed in the form of examples, and should not be construed as being limited thereto. In order to determine the gist of the present invention, the appended claims should be considered.

The series of processes described in the specification can be performed by hardware, software, or the combined configuration of them. When a process is to be performed by software, a program in which a processing sequence is recorded can be installed into a memory inside a computer incorporated into dedicated hardware, whereby the program is executed, or a program can be installed into a general-purpose computer capable of performing various processing, whereby the program is executed.

For example, a program can be recorded in advance in a hard disk and a ROM (Read Only Memory) as a recording medium. Alternatively, a program can be temporarily or permanently stored (recorded) in a removable recording medium, such as a flexible disk, a CD-ROM (Compact Disc Read-Only Memory), an MO (Magneto optical) disk, a DVD (Digital Versatile Disc), a magnetic disk, or a semiconductor memory. Such a removable recording medium can be provided as so-called packaged software.

In addition to being installed into a computer from the removable recording medium such as that described above, programs may be transferred in a wireless manner from a download site or may be transferred by wire to a computer via a network, such as a LAN (Local Area Network) or the Internet, and it is possible for the computer to receive the programs which are transferred in such a manner and to install the programs into the hard disk contained therein.

Various processes described in the specification may be executed not only chronologically according to the descriptions, but also may be executed concurrently or individually according to the processing performance of the apparatus which performs a process or as necessary.

INDUSTRIAL APPLICABILITY

As has thus been described, according to the configuration of the present invention, in an information recording medium, such as a CD, a first data storage area, which is set as a content storage area on which a copying prevention process is performed, and a second data storage area, which is a content storage area on which a copying prevention process is not performed and in which is stored an encrypted content file containing encrypted content, and encrypted key data such that key data for use in a decryption process of the encrypted content is encrypted and which can be decrypted in only a device having a license are set as different session areas. Thus, it is possible to play back the recorded content of the first data recording field in a playback device such as a CD player, and even in an information processing device capable of copying and ripping processing, such as a PC, it is possible to decrypt and play back encrypted content of the second data recording field under the condition of obtaining a license.

According to the configuration of the present invention, the encrypted content in the encrypted content file stored in the second data storage area is content which is encrypted using the content key Kc serving as an encryption processing key, and the content key Kc is set as a key which can be obtained by performing a process including a process for decrypting an enabling key block (EKB) based on key data provided using a key distribution tree structure. Therefore, management of content usage under a strict license management becomes possible.

According to the configuration of the present invention, the identifier data (PID) having a media ID serving as an identifier unique to the information recording medium and a MAC serving as alteration verification data are stored in the second data storage area, so that alteration verification using MAC verification is performed when a license is issued. Therefore, it is possible to eliminate the possibility that an invalid license is obtained.

According to the configuration of the present invention, a product ID serving as an identifier, which is set for each product corresponding to a set of a plurality of information recording media, is stored in the second data storage area, and the combination data of the media ID and the product ID is set as a global unique identifier. Therefore, it is possible to reliably and efficiently perform license issuance management.

The invention claimed is:

1. An information processing apparatus for performing a license obtaining process as a condition for a process for playing back content stored on a removable information recording medium, said information processing apparatus comprising:

means for obtaining, from a removable information recording medium having stored thereon encrypted content data and a content key for decrypting the encrypted content data, identifier data (PID) containing a media ID as identification information of the removable information recording medium and a MAC, at least generated based on the media ID, as alteration verification data, and a product ID corresponding to a set of removable information recording media, means for transmitting the obtained PD and product ID as license request data to license providing system component entities via a network, and means for receiving license data for decrypting the encrypted content data with the content key, wherein the content key is obtained by decrypting an enabling key block (EKB) based on key data provided by a key distribution tree structure; and said information processing apparatus receives, from said license providing system component entities, service data and usage right information as license data, executes the enabling key block (EKB) on the basis of the license data, and decrypts the encrypted content data stored in said information recording medium.

2. An information processing apparatus according to claim 1, wherein said encrypted content is content, which is encrypted by the content key Kc as an encryption processing key.

3. An information processing method for performing a license obtaining process as a condition for playing back content stored on a removable information recording medium, the information processing method comprising:

reading, from a removable information recording medium having stored thereon encrypted content data and a content key for decrypting the encrypted content data, identifier data (PID) containing a media ID as identification information of the removable information recording medium and a MAC, at least generated based on the media ID, as alteration verification data, and a product ID corresponding to a set of removable information recording media;

transmitting the PID and the product ID as license request data to license providing system component entities via a network;

receiving license data for decrypting the encrypted content data with the content key, wherein the content key is obtained by decrypting an enabling key block (EKB) based on key data provided by a key distribution tree structure;

receiving, from said license providing system component entities, service data and usage right information as license data;

executing the enabling key block (EKB) on the basis of the license data and decrypting the encrypted content data stored on said information recording medium.

4. An information processing method according to claim 3, wherein said encrypted content is content, which is encrypted by the content key Kc as an encryption processing key.

5. A computer readable medium storing a program for performing a license obtaining process as playback processing conditions for content stored on a removable information recording medium, said program comprising the steps of:

reading, from a removable information recording medium having stored thereon encrypted content data and a content key for decrypting the encrypted content data, identifier data (PID) containing a media ID as identification information of the removable information recording medium and a MAC, at least generated based on the media ID, as alteration verification data, and a product ID corresponding to a set of removable information recording media;

transmitting the PID and the product ID as license request data to license providing system component entities via a network;

receiving license data for decrypting the encrypted content data with the content key, wherein the content key is obtained by decrypting an enabling key block (EKB) based on key data provided by a key distribution tree structure receiving, from said license providing system component entities, service data and usage right information as license data; and executing the enabling key block (EKB) on the basis of the license data and decrypting the encrypted content data stored on said information recording medium.

* * * * *